United States Patent
Iwai

(10) Patent No.: US 11,261,816 B2
(45) Date of Patent: Mar. 1, 2022

(54) FUEL TYPE ESTIMATION SYSTEM, DATA ANALYSIS APPARATUS, AND CONTROL APPARATUS FOR FUEL SUPPLY APPARATUS

(71) Applicant: TOYOTA JIDOSHA KABUSHIKI KAISHA, Toyota (JP)

(72) Inventor: Akira Iwai, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/244,191

(22) Filed: Apr. 29, 2021

(65) Prior Publication Data

US 2021/0363932 A1 Nov. 25, 2021

(30) Foreign Application Priority Data

May 21, 2020 (JP) .............................. JP2020-089241

(51) Int. Cl.
*F02D 41/30* (2006.01)
*F02D 41/24* (2006.01)
*F02D 41/14* (2006.01)

(52) U.S. Cl.
CPC ..... *F02D 41/2422* (2013.01); *F02D 41/1454* (2013.01); *F02D 41/3082* (2013.01); *F02D 2200/023* (2013.01); *F02D 2200/0414* (2013.01); *F02D 2200/0625* (2013.01); *F02D 2200/101* (2013.01); *F02D 2200/1002* (2013.01); *F02D 2250/31* (2013.01)

(58) Field of Classification Search
CPC ............ F02D 41/2422; F02D 41/1454; F02D 41/3082; F02D 2200/0414; F02D 2200/101; F02D 2200/0625; F02D 2200/023; F02D 2200/1002; F02D 2250/31
USPC ......... 123/1 A, 468; 701/103–107; 73/35.02, 73/35.07, 114.38
See application file for complete search history.

(56) References Cited

U.S. PATENT DOCUMENTS 6,543,423 B2 * 4/2003 Dobryden ............. F02D 19/061 123/480

FOREIGN PATENT DOCUMENTS

| JP | 2007-263095 A | 10/2007 |
| JP | 2013-024211 A | 2/2013 |
| JP | 2015-148193 A | 8/2015 |

* cited by examiner

*Primary Examiner* — Hai H Huynh
(74) *Attorney, Agent, or Firm* — Oblon, McClelland, Maier & Neustadt, L.L.P.

(57) ABSTRACT

A fuel type estimation system configured to estimate a type variable related to a type of fuel in an engine system including an engine and a fuel supply apparatus includes a storage device and an execution device. The storage device is configured to store a mapping that uses, as inputs, input variables including an engine variable related to a condition of the engine and outputs the type variable. The execution device is configured to acquire the input variables, and estimate the type variable by applying the acquired input variables to the mapping.

9 Claims, 18 Drawing Sheets

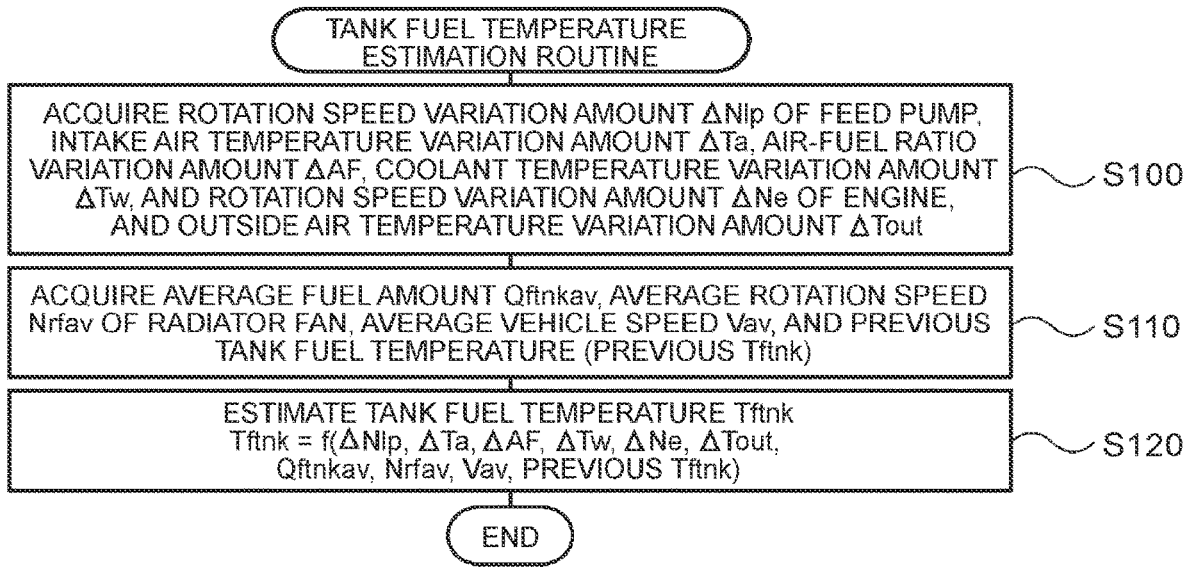
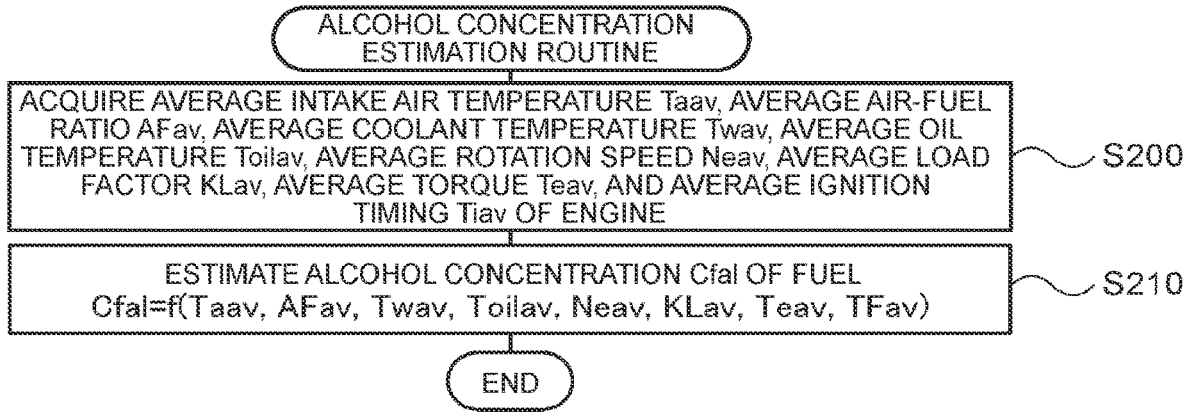
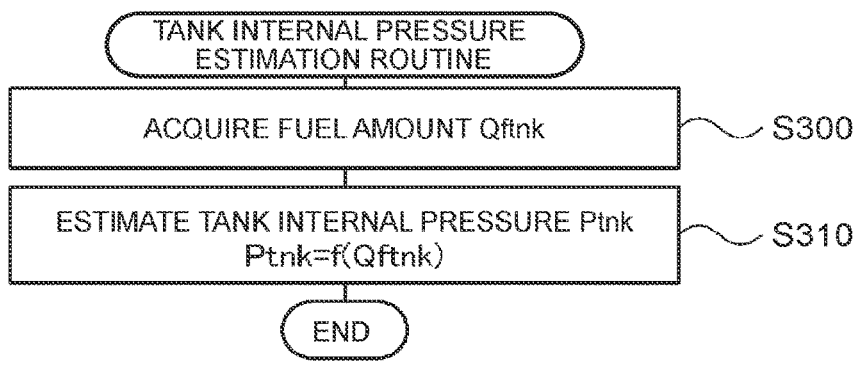

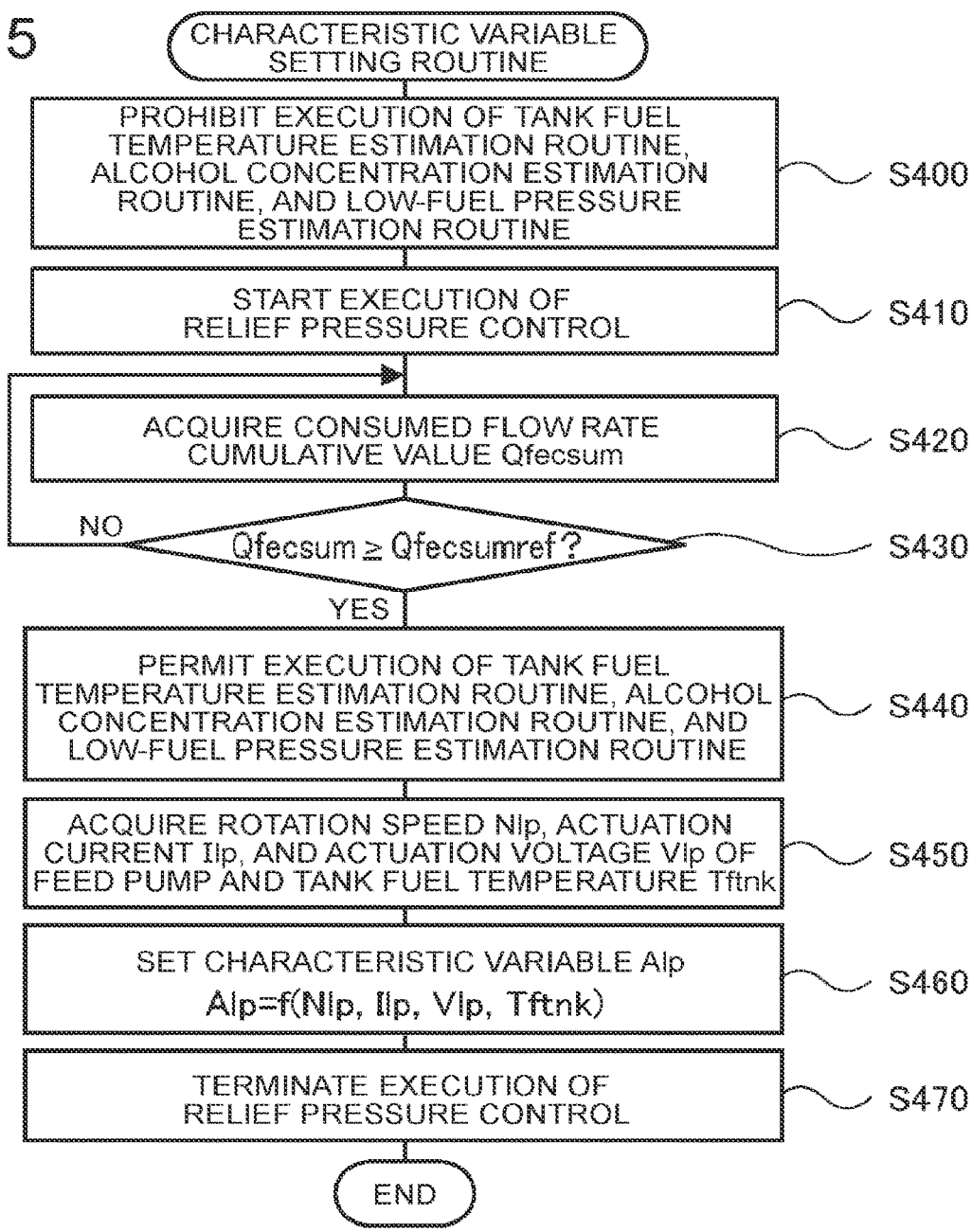
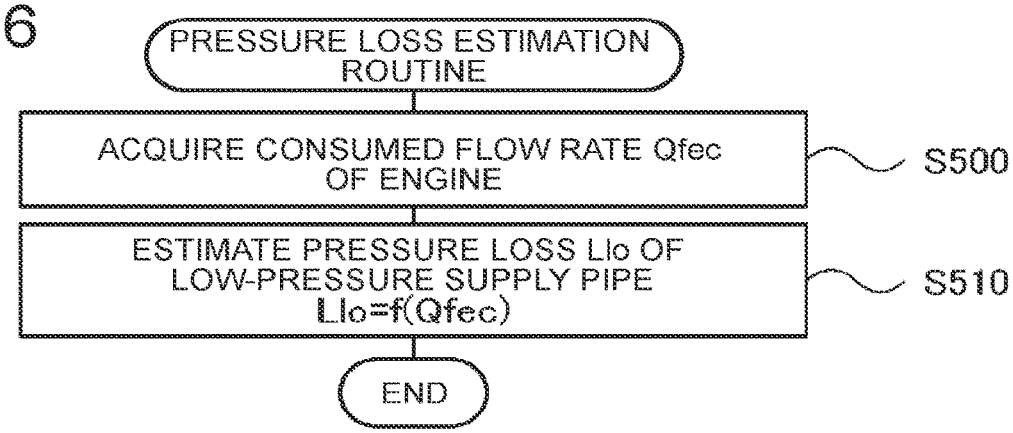

FUEL TYPE ESTIMATION SYSTEM, DATA ANALYSIS APPARATUS, AND CONTROL APPARATUS FOR FUEL SUPPLY APPARATUS

CROSS-REFERENCE TO RELATED APPLICATION

This application claims priority to Japanese Patent Application No. 2020-089241 filed on May 21, 2020, incorporated herein by reference in its entirety.

BACKGROUND

1. Technical Field

The present disclosure relates to a fuel type estimation system, a data analysis apparatus, and a control apparatus for a fuel supply apparatus.

2. Description of Related Art

As this type of technology, there is a proposal for a technology in which, in an engine system including an engine having a fuel injection valve and a fuel passage extending from the inside of a fuel tank to the fuel injection valve, an alcohol concentration sensor provided in the fuel passage detects an alcohol concentration of fuel (see, for example, Japanese Unexamined Patent Application Publication No. 2015-148193 (JP 2015-148193 A)).

SUMMARY

In the engine system described above, it is necessary that a sensor such as the alcohol concentration sensor configured to directly detect the type of the fuel be provided in the fuel passage to grasp the type of the fuel. In recent years, there is a demand to devise a method for estimating the type of fuel without using the sensor configured to directly detect the type of the fuel from the viewpoint of reducing the number of components and costs. However, no appropriate method has been devised thus far.

The present disclosure provides a fuel type estimation system, a data analysis apparatus, and a control apparatus for a fuel supply apparatus, which can estimate the type of fuel without providing the sensor configured to directly detect the type of the fuel.

A fuel type estimation system according to a first aspect of the present disclosure is configured to estimate a type variable related to a type of fuel in an engine system. The engine system includes an engine including a fuel injection valve, and a fuel supply apparatus including a fuel pump configured to supply the fuel in a fuel tank to a supply pipe connected to the fuel injection valve. The fuel type estimation system includes a storage device and an execution device. The storage device is configured to store a mapping that uses, as inputs, input variables including an engine variable related to a condition of the engine and outputs the type variable. The execution device is configured to acquire the input variables, and estimate the type variable by applying the acquired input variables to the mapping.

In the fuel type estimation system according to the first aspect of the present disclosure, the storage device stores the mapping that uses, as the inputs, the input variables including the engine variable related to the condition of the engine and outputs the type variable. The execution device acquires the input variables, and estimates the type variable by applying the acquired input variables to the mapping. The inventors have found through, for example, experiment and analysis that the engine variable has a relationship with the type variable (the engine variable affects the type variable). By estimating the type variable by applying the input variables to the mapping, the type variable can be estimated without providing a sensor configured to directly detect the type variable. The type variable may include an alcohol concentration variable related to an alcohol concentration of the fuel. The mapping may be set by machine learning or through, for example, manual experiment or analysis.

In the fuel type estimation system according to the first aspect of the present disclosure, the engine variable may include at least a part of an intake air temperature variable related to an intake air temperature of the engine, an air-fuel ratio variable related to an air-fuel ratio of the engine, a coolant temperature variable related to a temperature of a coolant of the engine, an oil temperature variable related to a temperature of lubricating oil of the engine, an engine speed variable related to a rotation speed of the engine, a load factor variable related to a load factor of the engine, an engine torque variable related to a torque of the engine, and an ignition timing variable related to an ignition timing of the engine.

In the fuel type estimation system according to the first aspect of the present disclosure, the execution device may be configured not to estimate the type variable in at least one of a case where the engine speed variable is a value corresponding to zero for the rotation speed of the engine and a case where the engine torque variable is a value corresponding to zero for the torque of the engine. In the fuel type estimation system according to the first aspect of the present disclosure, it is possible to avoid low-accuracy estimation of the type variable.

In the fuel type estimation system according to the first aspect of the present disclosure, the fuel supply apparatus may further include a relief valve provided in the supply pipe. The execution device may be configured to execute, when the fuel is supplied to the fuel tank, relief pressure control for driving the fuel pump to open the relief valve until a predetermined termination condition is satisfied. The execution device may be configured not to estimate, when the fuel is supplied to the fuel tank, the type variable until the predetermined termination condition is satisfied. In the fuel type estimation system according to the first aspect of the present disclosure, it is possible to avoid the low-accuracy estimation of the type variable.

In the fuel type estimation system according to the first aspect of the present disclosure, the predetermined termination condition may be that a cumulative value of consumed flow rate variables after the fuel is supplied to the fuel tank is equal to or larger than a predetermined value. In the fuel type estimation system according to the first aspect of the present disclosure, the execution device may be configured to drive the fuel pump to rotate at a predetermined rotation speed as the relief pressure control. The predetermined termination condition may be that a change amount of an actuation current of the fuel pump in a predetermined period is equal to or smaller than a predetermined change amount. In the fuel type estimation system according to the first aspect of the present disclosure, the predetermined termination condition can be set more appropriately.

In the fuel type estimation system according to the first aspect of the present disclosure, the execution device may include a first execution device mounted on a vehicle, and a second execution device located outside the vehicle. The first execution device may be configured to acquire the input variables. The first execution device may be configured to transmit the acquired input variables to the second execution device. The first execution device may be configured to receive estimated data from the second execution device. The second execution device may be configured to receive the input variables from the first execution device. The second execution device may be configured to estimate the type variable by applying the received input variables to the mapping. The second execution device may be configured to transmit the estimated type variable to the first execution device as the estimated data. In the fuel type estimation system according to the first aspect of the present disclosure, a processing load on the first execution device can be reduced.

A data analysis apparatus according to a second aspect of the present disclosure is used in a fuel type estimation system configured to estimate a type variable related to a type of fuel in an engine system. The engine system includes an engine including a fuel injection valve, and a fuel supply apparatus including a fuel pump configured to supply the fuel in a fuel tank to a supply pipe connected to the fuel injection valve. The fuel type estimation system includes a storage device and an execution device. The storage device is configured to store a mapping that uses, as inputs, input variables including an engine variable related to a condition of the engine and outputs the type variable. The execution device is configured to acquire the input variables, and estimate the type variable by applying the acquired input variables to the mapping. The execution device includes a first execution device and a second execution device. The first execution device is configured to acquire the input variables. The first execution device is configured to transmit the acquired input variables to the second execution device. The first execution device is configured to receive estimated data from the second execution device. The second execution device is configured to receive the input variables from the first execution device. The second execution device is configured to estimate the type variable by applying the received input variables to the mapping. The second execution device is configured to transmit the estimated type variable to the first execution device as the estimated data. The data analysis apparatus includes the second execution device and the storage device. The data analysis apparatus according to the second aspect of the present disclosure can function as a part of the fuel type estimation system.

A control apparatus for a fuel supply apparatus according to a third aspect of the present disclosure is used in a fuel type estimation system configured to estimate a type variable related to a type of fuel in an engine system. The engine system includes an engine including a fuel injection valve, and the fuel supply apparatus including a fuel pump configured to supply the fuel in a fuel tank to a supply pipe connected to the fuel injection valve. The fuel type estimation system includes a storage device and an execution device. The storage device is configured to store a mapping that uses, as inputs, input variables including an engine variable related to a condition of the engine and outputs the type variable. The execution device is configured to acquire the input variables, and estimate the type variable by applying the acquired input variables to the mapping. The execution device includes a first execution device and a second execution device. The first execution device is configured to acquire the input variables. The first execution device is configured to transmit the acquired input variables to the second execution device. The first execution device is configured to receive estimated data from the second execution device. The second execution device is configured to receive the input variables from the first execution device. The second execution device is configured to estimate the type variable by applying the received input variables to the mapping. The second execution device is configured to transmit the estimated type variable to the first execution device as the estimated data. The control apparatus for the fuel supply apparatus includes the first execution device. The control apparatus for the fuel supply apparatus according to the third aspect of the present disclosure can function as a part of the fuel type estimation system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart illustrating an example of a tank fuel temperature estimation routine;

FIG. 3 is a flowchart illustrating an example of an alcohol concentration estimation routine;

FIG. 4 is a flowchart illustrating an example of a tank internal pressure estimation routine;

FIG. 5 is a flowchart illustrating an example of a characteristic variable setting routine;

FIG. 6 is a flowchart illustrating an example of a pressure loss estimation routine;

DETAILED DESCRIPTION OF EMBODIMENTS

An embodiment of the present disclosure is described.

Figure 1:
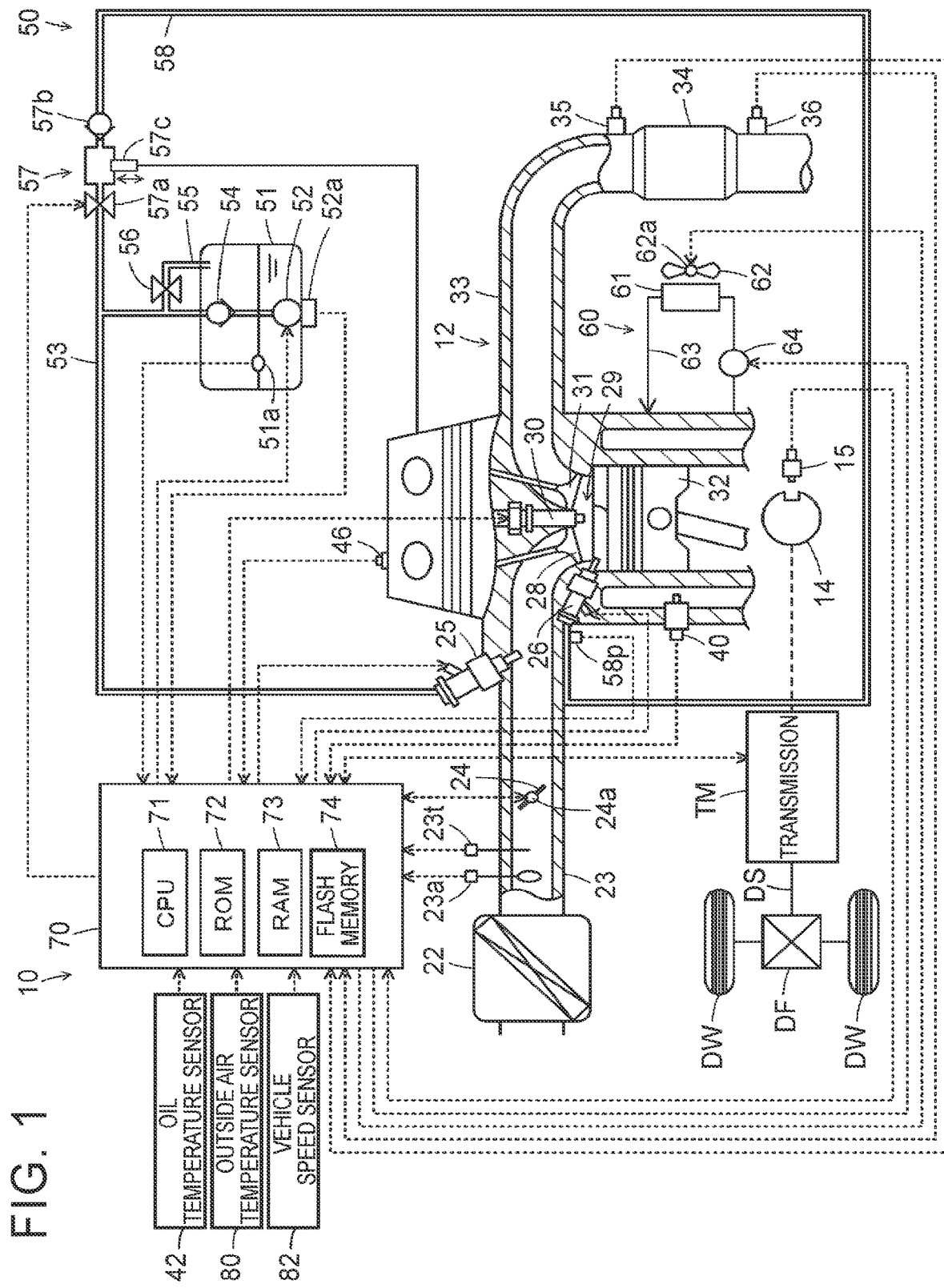
FIG. 1 is a structural diagram illustrating an overview of the structure of a vehicle 10 including a fuel type estimation system according to one embodiment of the present disclosure.

FIG. 1 is a structural diagram illustrating an overview of the structure of a vehicle 10 including a fuel type estimation system according to one embodiment of the present disclosure. As illustrated in FIG. 1, the vehicle 10 of the embodiment includes an engine 12, a fuel supply apparatus 50, a cooling apparatus 60, a transmission TM, and an electronic control unit 70. The transmission TM changes the speed of power from the engine 12, and transmits the power to a driving shaft DS coupled to driving wheels DW via a differential gear DF. The vehicle 10 may be a hybrid vehicle including a motor in addition to the engine 12. The electronic control unit 70 may be regarded as "fuel type estimation system" according to the embodiment.

The engine 12 is an internal combustion engine configured to output power by using fuel such as gasoline or light oil. The engine 12 includes a port injection valve 25 configured to inject fuel through an intake port, and a direct injection valve 26 configured to inject fuel into a cylinder. With the port injection valve 25 and the direct injection valve 26, the engine 12 can operate in a port injection mode, a direct injection mode, or a combined injection mode.

In the port injection mode, air cleaned by an air cleaner 22 is taken into an intake pipe 23 and caused to pass through a throttle valve 24 and fuel is injected from the port injection valve 25, whereby the air and the fuel are mixed together. The engine 12 takes the air-fuel mixture into a combustion chamber 29 via an intake valve 28, and explosively combusts the air-fuel mixture by an electric spark generated by a spark plug 30. The engine 12 converts reciprocating motion of a piston 32 pushed down by energy generated through the explosive combustion into rotational motion of a crankshaft 14. In the direct injection mode, air is taken into the combustion chamber 29 similarly to the port injection mode, fuel is injected from the direct injection valve 26 during an intake stroke or after the start of a compression stroke, and an air-fuel mixture is explosively combusted by an electric spark generated by the spark plug 30, whereby a rotational motion of the crankshaft 14 is obtained. In the combined injection mode, fuel is injected from the port injection valve 25 when air is taken into the combustion chamber 29, fuel is also injected from the direct injection valve 26 in the intake stroke or the compression stroke, and an air-fuel mixture is explosively combusted by an electric spark generated by the spark plug 30, whereby a rotational motion of the crankshaft 14 is obtained. Those injection modes are switched depending on operating conditions of the engine 12. Exhaust gas discharged from the combustion chamber 29 into an exhaust pipe 33 via an exhaust valve 31 is discharged into outside air via an exhaust gas control apparatus 34 including an exhaust gas control catalyst (three-way catalyst) configured to remove harmful components such as carbon monoxide (CO), hydrocarbon (HC), and nitrogen oxide ($NO_x$).

The fuel supply apparatus 50 supplies fuel in a fuel tank 51 to the port injection valve 25 or the direct injection valve 26 of the engine 12. The fuel supply apparatus 50 includes the fuel tank 51, a feed pump 52, a low-pressure supply pipe 53, a check valve 54, a relief channel 55, a relief valve 56, a high-pressure pump 57, and a high-pressure supply pipe 58.

The feed pump 52 is arranged in the fuel tank 51 as an electric pump to be actuated by electric power supplied from a battery (not illustrated). The feed pump 52 supplies the fuel in the fuel tank 51 to the low-pressure supply pipe 53. The low-pressure supply pipe 53 is connected to the port injection valve 25. The check valve 54 is provided on the low-pressure supply pipe 53 to allow a flow of the fuel in a direction from the feed pump 52 to the port injection valve 25 and restrict a flow of the fuel in an opposite direction.

The relief channel 55 is connected to the low-pressure supply pipe 53 and the fuel tank 51. The relief valve 56 is provided in the relief channel 55. The relief valve 56 is closed when a fuel pressure in the low-pressure supply pipe 53 is lower than a threshold Pflolim, and is opened when the fuel pressure in the low-pressure supply pipe 53 is equal to or higher than the threshold Pflolim. When the relief valve 56 is opened, a part of the fuel in the low-pressure supply pipe 53 returns to the fuel tank 51 via the relief channel 55. In this manner, an excess of the fuel pressure in the low-pressure supply pipe 53 is suppressed.

The high-pressure pump 57 is driven by the power from the engine 12 (in the embodiment, rotation of an intake cam shaft configured to open or close the intake valve 28), and supplies the fuel in the low-pressure supply pipe 53 to the high-pressure supply pipe 58 by pressurizing the fuel. The high-pressure pump 57 includes an electromagnetic valve 57a, a check valve 57b, and a plunger 57c. The electromagnetic valve 57a is connected to an intake port of the high-pressure pump 57, and is opened or closed when pressurizing the fuel. The check valve 57b is connected to a discharge port of the high-pressure pump 57 to restrict a backflow of the fuel and keep a fuel pressure in the high-pressure supply pipe 58. The plunger 57c is actuated through rotation of the engine 12 (rotation of the intake cam shaft) (moves up and down in FIG. 1). During the operation of the engine 12, the fuel in the low-pressure supply pipe 53 is taken into the high-pressure pump 57 when the electromagnetic valve 57a is opened, and the fuel compressed by the plunger 57c is intermittently sent into the high-pressure supply pipe 58 via the check valve 57b when the electromagnetic valve 57a is closed. In this way, the high-pressure pump 57 pressurizes the fuel to be supplied to the high-pressure supply pipe 58. During the driving of the high-pressure pump 57, the fuel pressure in the low-pressure supply pipe 53 and the fuel pressure in the high-pressure supply pipe 58 (pressures of the fuel) pulsate in response to the rotation of the engine 12 (rotation of the intake cam shaft). The high-pressure supply pipe 58 is connected to the direct injection valve 26.

The cooling apparatus 60 includes a radiator 61, a radiator fan 62, a coolant circulation channel 63, and an electric pump 64. The radiator 61 exchanges heat between a coolant and air. The radiator fan 62 sends air to the radiator 61. The circulation channel 63 is formed by including the radiator 61 and the engine 12. The electric pump 64 is provided in the circulation channel 63 to send the coolant under pressure.

The electronic control unit 70 is a microcomputer including a central processing unit (CPU) 71, a read-only memory (ROM) 72, a random-access memory (RAM) 73, a flash memory 74, and input and output ports. The CPU 71 may be regarded as "execution device" according to the embodiment. The flash memory 74 may be regarded as "storage device" according to the embodiment.

Signals from various sensors are input to the electronic control unit 70 via the input port. Examples of signals related to the engine 12 among the signals to be input to the electronic control unit 70 include a crank angle θcr from a crank position sensor 15 configured to detect a rotational position of the crankshaft 14 of the engine 12, a coolant temperature Tw from a coolant temperature sensor 40 configured to detect a temperature of the coolant of the engine 12, and an oil temperature Toil from an oil temperature sensor 42 configured to detect a temperature of lubricating oil of the engine 12. Examples of the signals also include cam angles θci and θco from cam position sensors 44 configured to detect a rotational position of the intake cam shaft configured to open or close the intake valve 28 and a rotational position of an exhaust cam shaft configured to open or close the exhaust valve 31. Examples of the signals also include a throttle valve opening degree TH from a throttle position sensor 24a configured to detect a position of the throttle valve 24, an intake air amount Qa from an airflow meter 23a attached to the intake pipe 23, and an intake air temperature Ta from a temperature sensor 23t attached to the intake pipe 23. Examples of the signals also include an air-fuel ratio AF from an air-fuel ratio sensor 35 attached on an upstream side of the exhaust gas control apparatus 34 in the exhaust pipe 33, and an oxygen signal O2 from an oxygen sensor 36 attached on a downstream side of the exhaust gas control apparatus 34 in the exhaust pipe 33.

Examples of signals related to the fuel supply apparatus 50 and the cooling apparatus 60 among the signals to be input to the electronic control unit 70 include a rotation speed Nlp of the feed pump 52 and an actuation current Ilp and an actuation voltage Vlp supplied to the feed pump 52 from the battery (not illustrated). Those signals are sent from a condition detector 52a attached to the feed pump 52. Examples of the signals also include a fuel amount Qftnk from a fuel amount sensor 51a configured to detect a fuel amount in the fuel tank 51, and a high-fuel pressure Pfhi (pressure of the fuel in the high-pressure supply pipe 58) from a fuel pressure sensor 58p attached near the direct injection valve 26 in the high-pressure supply pipe 58 (for example, a high-pressure delivery pipe). Examples of the signals also include a rotation speed Nrf of the radiator fan 62 from a rotation speed sensor 62a attached to the radiator fan 62.

Examples of signals other than the above among the signals to be input to the electronic control unit 70 include a signal from the transmission TM, an outside air temperature Tout from an outside air temperature sensor 80, and a vehicle speed V from a vehicle speed sensor 82. Although illustration is omitted, examples of the signals also include an ignition signal IG from an ignition switch, a shift position SP from a shift position sensor configured to detect an operation position of a shift lever, an accelerator operation amount Acc from an accelerator position sensor configured to detect a depression amount of an accelerator pedal, and a brake position BP from a brake position sensor configured to detect a depression amount of a brake pedal.

Various control signals are output from the electronic control unit 70 via the output port. Examples of the signals to be output from the electronic control unit 70 include control signals for the throttle valve 24, the port injection valve 25, the direct injection valve 26, and the spark plug 30 of the engine 12. Examples of the signals also include a control signal for the feed pump 52 of the fuel supply apparatus 50 and a control signal for the electromagnetic valve 57a of the high-pressure pump 57. Examples of the signals also include control signals for the radiator fan 62 and the electric pump 64 of the cooling apparatus 60. Examples of the signals also include a control signal for the transmission TM.

The electronic control unit 70 calculates a rotation speed Ne, a load factor KL, and a torque Te of the engine 12. The rotation speed Ne of the engine 12 is calculated based on the crank angle θcr from the crank position sensor 15. The load factor KL of the engine 12 is a ratio of a volume of air actually taken in one cycle to a stroke volume of the engine 12 per cycle, and is calculated based on the intake air amount Qa from the airflow meter 23a and the rotation speed Ne of the engine 12. The torque Te of the engine 12 is calculated (estimated) based on the throttle valve opening degree TH from the throttle position sensor 24a. The electronic control unit 70 also calculates consumed flow rates Qfpc and Qfdc of the port injection valve 25 and the direct injection valve 26 and a consumed flow rate Qfec of the engine 12. The consumed flow rates Qfpc and Qfdc of the port injection valve 25 and the direct injection valve 26 are calculated based on fuel injection amounts Qfp and Qfd of the port injection valve 25 and the direct injection valve 26. The consumed flow rate Qfec of the engine 12 is calculated as the sum of the consumed flow rates Qfpc and Qfdc of the port injection valve 25 and the direct injection valve 26.

In the vehicle 10 of the embodiment structured as described above, the CPU 71 of the electronic control unit 70 performs intake air amount control, fuel injection control, and ignition control for the engine 12 to operate the engine 12, and also controls the feed pump 52 and the high-pressure pump 57 (electromagnetic valve 57a) of the fuel supply apparatus 50.

For example, the intake air amount control for the engine 12 is performed by setting a target intake air amount Qa* based on a target load factor KL* of the engine 12 that is based on the accelerator operation amount Acc and the vehicle speed V, setting a target throttle valve opening degree TH* so that the intake air amount Qa is equal to the target intake air amount Qa*, and controlling the throttle valve 24 by using the target throttle valve opening degree TH*. The fuel injection control is performed by setting an injection mode to be executed among the port injection mode, the direct injection mode, and the combined injection mode based on the rotation speed Ne and the load factor KL of the engine 12, setting target injection amounts Qfp* and Qfd* of the port injection valve 25 and the direct injection valve 26 so that the air-fuel ratio AF is equal to a target air-fuel ratio AF* (for example, a stoichiometric air-fuel ratio) based on the intake air amount Qa and the injection mode to be executed, and controlling the port injection valve 25 and the direct injection valve 26 by using the target injection amounts Qfp* and Qfd*. The ignition control is performed by setting a target ignition timing Ti* based on the rotation speed Ne and the target load factor KL* of the engine 12, and controlling the spark plug 30 by using the set target ignition timing Ti*.

For example, the fuel supply apparatus 50 is controlled as follows. First, the CPU 71 of the electronic control unit 70 sets, based on the rotation speed Ne and the target load factor KL* of the engine 12, a target low-fuel pressure Pflo* and a target high-fuel pressure Pfhi* that are target values of a low-fuel pressure and a high-fuel pressure of the fuel in the low-pressure supply pipe 53 and the high-pressure supply pipe 58, respectively. Then, the CPU 71 sets a target discharge flow rate Qflpo* or a target rotation speed Nlp* of the feed pump 52 so that a low-fuel pressure Pflo is equal to the target low-fuel pressure Pflo*, sets a target duty Dlp* of the feed pump 52 based on the target discharge flow rate Qflpo* or the target rotation speed Nlp*, and controls the feed pump 52 by using the target duty Dlp*. Further, the CPU 71 sets a target discharge flow rate Qfhpo* of the high-pressure pump 57 so that the high-fuel pressure Pfhi is equal to the target high-fuel pressure Pfhi*, sets a target duty Dhp of the electromagnetic valve 57*a* of the high-pressure pump 57 based on the target discharge flow rate Qfhpo*, and controls the electromagnetic valve 57*a* by using the target duty Dhp*. A value estimated through a process described later is used as the low-fuel pressure Pflo, and a value detected by the fuel pressure sensor 58*p* is used as the high-fuel pressure Pfhi.

Next, description is given of operations of the vehicle 10 of the embodiment structured as described above. In particular, description is given of processes for setting a tank fuel temperature Tftnk that is a temperature of the fuel in the fuel tank 51, an alcohol concentration Cfal serving as a fuel type, a tank internal pressure Ptnk that is a pressure in the fuel tank 51, and a characteristic variable Alp related to a characteristic of the feed pump 52 (individual difference). Description is also given of a process for estimating a pressure loss Llo of the low-pressure supply pipe 53, and a process for estimating a high-pressure pump fuel temperature Tfhp that is a temperature of the fuel in the high-pressure pump 57 near the low-pressure supply pipe 53. Description is also given of a process for estimating the low-fuel pressure Pflo and a base value Pflobs and a pulsation component Pflopl of the low-fuel pressure Pflo.

Figure 7:
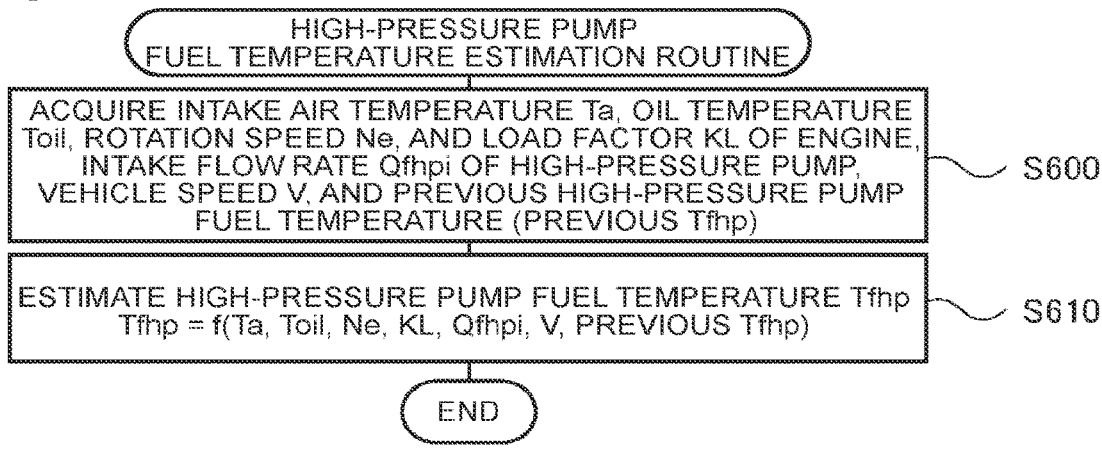
FIG. 7 is a flowchart illustrating an example of a high-pressure pump fuel temperature estimation routine.
Figure 8:
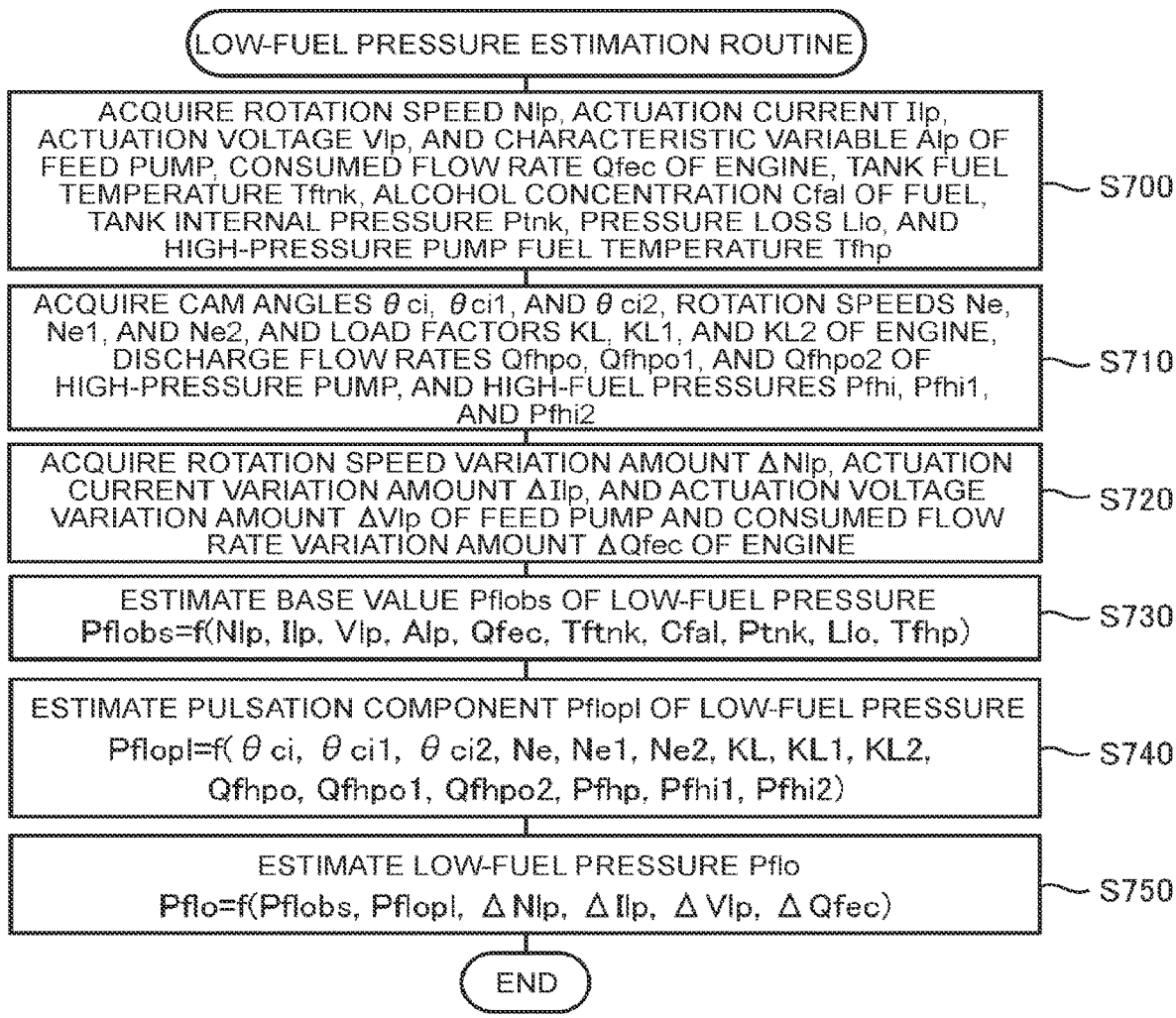
FIG. 8 is a flowchart illustrating an example of a low-fuel pressure estimation routine.

FIG. 2 is a flowchart illustrating an example of a tank fuel temperature estimation routine. FIG. 3 is a flowchart illustrating an example of an alcohol concentration estimation routine. FIG. 4 is a flowchart illustrating an example of a tank internal pressure estimation routine. FIG. 5 is a flowchart illustrating an example of a characteristic variable setting routine. FIG. 6 is a flowchart illustrating an example of a pressure loss estimation routine. FIG. 7 is a flowchart illustrating an example of a high-pressure pump fuel temperature estimation routine. FIG. 8 is a flowchart illustrating an example of a low-fuel pressure estimation routine. The electronic control unit 70 reads programs stored in the ROM 72 and executes the routines of FIG. 2 to FIG. 8. The routines are described below in sequence.

The process for estimating the tank fuel temperature Tftnk is described with reference to the tank fuel temperature estimation routine of FIG. 2. This routine is repeatedly executed by the electronic control unit 70 except when the execution is prohibited through the characteristic variable setting routine of FIG. 5. When the execution is prohibited through the characteristic variable setting routine of FIG. 5, a previous value is kept for the tank fuel temperature Tftnk in the embodiment. In the tank fuel temperature estimation routine of FIG. 2, the CPU 71 of the electronic control unit 70 first acquires a rotation speed variation amount ΔNlp of the feed pump 52, an intake air temperature variation amount ΔTa, an air-fuel ratio variation amount ΔAF, a coolant temperature variation amount ΔTw, and a rotation speed variation amount ΔNe of the engine 12, and an outside air temperature variation amount ΔTout (Step S100).

In the embodiment, the CPU 71 of the electronic control unit 70 acquires, for each of the rotation speed variation amount ΔNlp of the feed pump 52, the intake air temperature variation amount ΔTa, the air-fuel ratio variation amount ΔAF, the coolant temperature variation amount ΔTw, and the rotation speed variation amount ΔNe of the engine 12, and the outside air temperature variation amount ΔTout, a value calculated as a variation amount in a predetermined period Δt1 (difference between a maximum value and a minimum value) by using sequential values in the predetermined period Δt1 (values at individual times to a current time from a time that is earlier by the predetermined period Δt1) about each of the rotation speed Nlp of the feed pump 52, the intake air temperature Ta, the air-fuel ratio AF, the coolant temperature Tw, and the rotation speed Ne of the engine 12, and the outside air temperature Tout. For example, the predetermined period Δt1 is about 20 seconds to 60 seconds.

For the rotation speed Nlp of the feed pump 52, the CPU 71 of the electronic control unit 70 acquires a value detected by the condition detector 52*a*. For the intake air temperature Ta of the engine 12, the CPU 71 of the electronic control unit 70 acquires a value detected by the airflow meter 23*a*. For the air-fuel ratio AF, the CPU 71 of the electronic control unit 70 acquires a value detected by the air-fuel ratio sensor 35. For the coolant temperature Tw, the CPU 71 of the electronic control unit 70 acquires a value detected by the coolant temperature sensor 40. For the rotation speed Ne, the CPU 71 of the electronic control unit 70 acquires a value calculated based on the crank angle θcr detected by the crank position sensor 15. For the outside air temperature Tout, the CPU 71 of the electronic control unit 70 acquires a value detected by the outside air temperature sensor 80.

The CPU 71 of the electronic control unit 70 acquires an average fuel amount Qftnkav in the fuel tank 51, an average rotation speed Nrfav of the radiator fan 62, an average vehicle speed Vav, and a previously estimated tank fuel temperature (previous Tftnk) (Step S110). In the embodiment, the CPU 71 of the electronic control unit 70 acquires, for each of the average fuel amount Qftnkav in the fuel tank 51, the average rotation speed Nrfav of the radiator fan 62, and the average vehicle speed Vav, a value calculated as an average in the predetermined period Δt1 by using sequential values in the predetermined period Δt1 about each of the fuel amount Qftnk in the fuel tank 51, the rotation speed Nrf of the radiator fan 62, and the vehicle speed V. For the fuel amount Qftnk in the fuel tank 51, the CPU 71 of the electronic control unit 70 acquires a value detected by the fuel amount sensor 51*a*. For the rotation speed Nrf of the radiator fan 62, the CPU 71 of the electronic control unit 70 acquires a value detected by the rotation speed sensor 62*a*. For the vehicle speed V, the CPU 71 of the electronic control unit 70 acquires a value detected by the vehicle speed sensor 82.

The CPU 71 of the electronic control unit 70 estimates a tank fuel temperature Tftnk by using a tank fuel temperature mapping and the rotation speed variation amount ΔNlp of the feed pump 52, the intake air temperature variation amount ΔTa, the air-fuel ratio variation amount ΔAF, the coolant temperature variation amount ΔTw, and the rotation speed variation amount ΔNe of the engine 12, the outside air temperature variation amount ΔTout, the average fuel amount Qftnkav in the fuel tank 51, the average rotation speed Nrfav of the radiator fan 62, the average vehicle speed Vav, and the previously estimated tank fuel temperature (previous Tftnk), which are acquired in Steps S100 and S110 (Step S120). Then, the CPU 71 terminates this routine.

The tank fuel temperature mapping uses, as inputs, input variables including the rotation speed variation amount ΔNlp of the feed pump 52, the intake air temperature variation amount ΔTa, the air-fuel ratio variation amount ΔAF, the coolant temperature variation amount ΔTw, and the rotation speed variation amount ΔNe of the engine 12, the outside air temperature variation amount ΔTout, the average fuel amount Qftnkav in the fuel tank 51, the average rotation speed Nrfav of the radiator fan 62, the average vehicle speed Vav, and the previously estimated tank fuel temperature (previous Tftnk), and outputs the tank fuel temperature Tftnk. The tank fuel temperature mapping is stored in the flash memory 74.

The process of Step S120 is performed as follows. The rotation speed variation amount ΔNlp of the feed pump 52, the intake air temperature variation amount ΔTa, the air-fuel ratio variation amount ΔAF, the coolant temperature variation amount ΔTw, and the rotation speed variation amount ΔNe of the engine 12, the outside air temperature variation amount ΔTout, the average fuel amount Qftnkav in the fuel tank 51, the average rotation speed Nrfav of the radiator fan 62, the average vehicle speed Vav, and the previously estimated tank fuel temperature (previous Tftnk) are set to input variables x[1] to x[10] of the tank fuel temperature mapping and the tank fuel temperature Tftnk is derived by applying the set input variables x[1] to x[10] to the tank fuel temperature mapping.

In the embodiment, the tank fuel temperature mapping is a neural network in which the number of intermediate layers (hidden layers) is a, activation functions h1 to ha of the intermediate layers are hyperbolic tangent functions, and an activation function f of an output layer is a rectified linear unit (ReLU) (ramp function). The activation functions h1 to ha of the intermediate layers are not limited to the hyperbolic tangent functions, and may be sigmoid functions or the like. The activation function f of the output layer is not limited to the ReLU, and may be, for example, an identity function. The value a is not limited to 2 or larger, and may be 1.

Expression (1) is a relational expression indicating an example of the tank fuel temperature mapping. In Expression (1), variables i, j, p represent nodes in each of the first intermediate layer, the second intermediate layer, . . . the α-th intermediate layer. A cumulative number "10" represents the number of nodes in an input layer (number of input variables). Cumulative numbers n1, . . . , nα represent the numbers of nodes in the first intermediate layer, . . . , the α-th intermediate layer. A variable x[i] represents each of the input variables x[1] to x[10]. Coefficients w[1, j, i] and w[2, k, j], . . . represent coefficients for defining input values of the nodes in the first intermediate layer, the second intermediate layer, . . . . A coefficient w[out, 1, p] represents a coefficient for defining input values in the output layer. Coefficients w[1, j, 0], w[2, k, 0], . . . w[out, 1, 0] are bias parameters, and x[0] is defined as 1.

$$Tftnk = f\left(\sum_{p=0}^{n\alpha} w[out, 1, p] \cdot h\alpha\left(\cdots h2\left(\sum_{j=0}^{n1} w[2, k, f] \cdot h1\left(\sum_{i=0}^{10} w[1, j, i] \cdot x[i]\right)\right)\right)\right) \quad (1)$$

In this manner, the tank fuel temperature Tftnk can be estimated. Since a fuel temperature sensor need not be provided in the fuel tank 51, the number of components and costs can be reduced. A method for generating the tank fuel temperature mapping is described later.

Next, the process for estimating the alcohol concentration Cfal is described with reference to the alcohol concentration estimation routine of FIG. 3. This routine is repeatedly executed by the electronic control unit 70 except when the execution is prohibited through the characteristic variable setting routine of FIG. 5. When the execution is prohibited through the characteristic variable setting routine of FIG. 5, a previous value is kept for the alcohol concentration Cfal in the embodiment. In the alcohol concentration estimation routine of FIG. 3, the CPU 71 of the electronic control unit 70 first acquires an average intake air temperature Taav, an average air-fuel ratio AFav, an average coolant temperature Twav, an average oil temperature Toilav, an average rotation speed Neav, an average load factor KLav, an average torque Teav, and an average ignition timing Tiav of the engine 12 (Step S200).

In the embodiment, the CPU 71 of the electronic control unit 70 acquires, for each of the average intake air temperature Taav, the average air-fuel ratio AFav, the average coolant temperature Twav, the average oil temperature Toilav, the average rotation speed Neav, the average load factor KLav, the average torque Teav, and the average ignition timing Tiav of the engine 12, a value calculated as an average in a predetermined period Δt2 by using sequential values in the predetermined period Δt2 (values at individual times to a current time from a time that is earlier by the predetermined period Δt2) about each of the intake air temperature Ta, the air-fuel ratio AF, the coolant temperature Tw, the oil temperature Toil, the rotation speed Ne, the load factor KL, the torque Te, and the ignition timing Ti of the engine 12. For example, the predetermined period Δt2 is about 80 seconds to 120 seconds.

For the intake air temperature Ta, the CPU 71 of the electronic control unit 70 acquires a value detected by the airflow meter 23a. For the air-fuel ratio AF, the CPU 71 of the electronic control unit 70 acquires a value detected by the air-fuel ratio sensor 35. For the coolant temperature Tw, the CPU 71 of the electronic control unit 70 acquires a value detected by the coolant temperature sensor 40. For the oil temperature Toil, the CPU 71 of the electronic control unit 70 acquires a value detected by the oil temperature sensor 42. For the rotation speed Ne, the CPU 71 of the electronic control unit 70 acquires a value calculated based on the crank angle θcr detected by the crank position sensor 15. For the load factor KL, the CPU 71 of the electronic control unit 70 acquires a value calculated based on the intake air amount Qa and the rotation speed Ne of the engine 12. For the torque Te, the CPU 71 of the electronic control unit 70 acquires a value calculated (estimated) based on the throttle valve opening degree TH detected by the throttle position sensor 24a. For the ignition timing Ti, the CPU 71 of the electronic control unit 70 acquires the target ignition timing Ti set in the ignition control.

The CPU 71 of the electronic control unit 70 estimates an alcohol concentration Cfal of the fuel by using an alcohol concentration mapping and the average intake air temperature Taav, the average air-fuel ratio AFav, the average coolant temperature Twav, the average oil temperature Toilav, the average rotation speed Neav, the average load factor KLav, the average torque Teav, and the average ignition timing Tiav of the engine 12, which are acquired in Step S200 (Step S210). Then, the CPU 71 terminates this routine.

The alcohol concentration mapping uses, as inputs, input variables including the average intake air temperature Taav, the average air-fuel ratio AFav, the average coolant temperature Twav, the average oil temperature Toilav, the average rotation speed Neav, the average load factor KLav, the average torque Teav, and the average ignition timing Tiav of the engine 12, and outputs the alcohol concentration Cfal of the fuel. The alcohol concentration mapping is stored in the flash memory 74.

The process of Step S210 is performed as follows. The average intake air temperature Taav, the average air-fuel ratio AFav, the average coolant temperature Twav, the average oil temperature Toilav, the average rotation speed Neav, the average load factor KLav, the average torque Teav, and the average ignition timing Tiav of the engine 12 are set to input variables x[1] to x[8] of the alcohol concentration mapping and the alcohol concentration Cfal of the fuel is derived by applying the set input variables x[1] to x[8] to the alcohol concentration mapping. In the embodiment, the alcohol concentration mapping is a neural network similarly to the tank fuel temperature mapping. In this manner, the alcohol concentration Cfal of the fuel can be estimated. Since a sensor configured to detect the alcohol concentration Cfal of the fuel need not be provided, the number of components and costs can be reduced. A method for generating the alcohol concentration mapping is described later.

Next, the process for estimating the tank internal pressure Ptnk is described with reference to the tank internal pressure estimation routine of FIG. 4. This routine is repeatedly executed by the electronic control unit 70. In the tank internal pressure estimation routine of FIG. 4, the CPU 71 of the electronic control unit 70 first acquires a fuel amount Qftnk in the fuel tank 51 (Step S300). For the fuel amount Qftnk in the fuel tank 51, the CPU 71 acquires a value detected by the fuel amount sensor 51a.

The CPU 71 of the electronic control unit 70 estimates a tank internal pressure Ptnk by using a tank internal pressure mapping and the fuel amount Qftnk in the fuel tank 51, which is acquired in Step S300 (Step S310). Then, the CPU 71 terminates this routine. The tank internal pressure mapping uses, as inputs, input variables including the fuel amount Qftnk in the fuel tank 51, and outputs the tank internal pressure Ptnk. The tank internal pressure mapping is stored in the flash memory 74.

The process of Step S310 is performed as follows. The fuel amount Qftnk in the fuel tank 51 is set to an input variable x[1] of the tank internal pressure mapping and the tank internal pressure Ptnk is derived by applying the set input variable x[1] to the tank internal pressure mapping. In the embodiment, the tank internal pressure mapping is a neural network. In this manner, the tank internal pressure Ptnk can be estimated. Since an internal pressure sensor need not be provided in the fuel tank 51, the number of components and costs can be reduced. A method for generating the tank internal pressure mapping is described later.

Next, the process for setting the characteristic variable Alp of the feed pump 52 is described with reference to the characteristic variable setting routine of FIG. 5. This routine is executed by the electronic control unit 70 when the system is activated after the fuel is supplied to the fuel tank 51. For example, whether the fuel is supplied is determined by checking whether the fuel amount Qftnk in the fuel tank 51 has increased, or by checking a result of communication with a gas station. In the embodiment, the characteristic variable Alp is represented as a relative value when a reference value is 1. When the characteristic variable setting routine of FIG. 5 is executed, the electronic control unit 70 first prohibits the execution of the tank fuel temperature estimation routine of FIG. 2, the alcohol concentration estimation routine of FIG. 3, and the low-fuel pressure estimation routine of FIG. 8 (Step S400), and starts execution of relief pressure control (Step S410).

The relief pressure control is performed by controlling the feed pump 52 to open the relief valve 56 because the fuel pressure in the low-pressure supply pipe 53 is equal to or higher than the threshold Pflolim. For example, the relief pressure control is performed by setting a target discharge flow rate Qflpo* or a target rotation speed Nlp of the feed pump 52 such that the fuel pressure in the low-pressure supply pipe 53 is higher than the threshold Pflolim to some extent when the relief valve 56 is not provided, setting a target duty Dlp* of the feed pump 52 based on the target discharge flow rate Qflpo* or the target rotation speed Nlp*, and controlling the feed pump 52 by using the target duty Dlp*.

When the fuel is supplied to the fuel tank 51, properties of the supplied fuel (temperature and alcohol concentration) may differ from properties of the fuel before the fuel supply. When attempt is made to adjust the fuel pressure in the low-pressure supply pipe 53 within a range in which the fuel pressure is lower than the threshold Pflolim to some extent in the case where the properties of the supplied fuel differ from the properties of the fuel before the fuel supply, the fuel pressure in the low-pressure supply pipe 53 may be unstable after the fuel supply to adversely affect the fuel injection control or the like. By executing the relief pressure control in the embodiment, the fuel pressure in the low-pressure supply pipe 53 can be stabilized at the threshold Pflolim even in the case where the properties of the supplied fuel differ from the properties of the fuel before the fuel supply. Thus, the adverse effect on the fuel injection control or the like can be suppressed.

In the case where the properties of the supplied fuel differ from the properties of the fuel before the fuel supply, the fuel before the fuel supply remains in the low-pressure supply pipe 53 or the like even if the fuel is mixed in the fuel tank 51. Therefore, the properties of the fuel may differ between, for example, the inside of the fuel tank 51 and the inside of the low-pressure supply pipe 53. When the tank fuel temperature Tftnk, the alcohol concentration Cfal, and the low-fuel pressure Pflo are estimated in this case, there is a possibility that the estimation accuracies of those values are not very high. In the embodiment, the execution of the tank fuel temperature estimation routine of FIG. 2, the alcohol concentration estimation routine of FIG. 3, and the low-fuel pressure estimation routine of FIG. 8 is prohibited in view of this possibility. Thus, it is possible to avoid the low-accuracy estimation of the tank fuel temperature Tftnk, the alcohol concentration Cfal, and the low-fuel pressure Pflo.

The electronic control unit 70 acquires a consumed flow rate cumulative value Qfecsum of the engine 12 (Step S420). A value calculated as a cumulative value of consumed flow rates Qfec of the engine 12 from the start of the execution of this routine is acquired for the consumed flow rate cumulative value Qfecsum of the engine 12. The consumed flow rate Qfec of the engine 12 is calculated as the sum of the consumed flow rates Qfpc and Qfdc of the port injection valve 25 and the direct injection valve 26 that are based on the fuel injection amounts Qfp and Qfd of the port injection valve 25 and the direct injection valve 26.

The electronic control unit 70 determines whether the consumed flow rate cumulative value Qfecsum of the engine 12 is equal to or larger than a threshold Qfecsumref (Step S430). The threshold Qfecsumref is used for determining whether all the remaining fuel before the fuel supply in the low-pressure supply pipe 53 or the high-pressure supply pipe 58 is injected from the port injection valve 25 and the direct injection valve 26, that is, whether the fuel before the fuel supply and the fuel after the fuel supply are sufficiently mixed in the fuel tank 51, the low-pressure supply pipe 53, and the high-pressure supply pipe 58. For example, the threshold Qfecsumref is set based on the volumes of the low-pressure supply pipe 53 and the high-pressure supply pipe 58. In the embodiment, the condition that the consumed flow rate cumulative value Qfecsum of the engine 12 is equal to or larger than the threshold Qfecsumref is used as a termination condition for the relief pressure control.

When the consumed flow rate cumulative value Qfecsum of the engine 12 is smaller than the threshold Qfecsumref, the electronic control unit 70 determines that the termination condition for the relief pressure control is not satisfied, and returns to Step S420. The electronic control unit 70 repeatedly executes the processes of Steps S420 and S430. When the consumed flow rate cumulative value Qfecsum of the engine 12 is equal to or larger than the threshold Qfecsumref in Step S430, the electronic control unit 70 determines that the termination condition for the relief pressure control is satisfied.

The electronic control unit 70 permits the execution of the tank fuel temperature estimation routine of FIG. 2, the alcohol concentration estimation routine of FIG. 3, and the low-fuel pressure estimation routine of FIG. 8 (Step S440), and then acquires a rotation speed Nlp, an actuation current Ilp, and an actuation voltage Vlp of the feed pump 52 and a tank fuel temperature Tftnk when the termination condition for the relief pressure control is satisfied (Step S450). For each of the rotation speed Nlp, the actuation current Ilp, and the actuation voltage Vlp of the feed pump 52 when the termination condition for the relief pressure control is satisfied, the electronic control unit 70 acquires a value detected by the condition detector 52a after the termination condition for the relief pressure control is satisfied. For the tank fuel temperature Tftnk when the termination condition for the relief pressure control is satisfied, the electronic control unit 70 acquires a value estimated through the tank fuel temperature estimation routine of FIG. 2 after the termination condition for the relief pressure control is satisfied.

The electronic control unit 70 sets a characteristic variable Alp of the feed pump 52 by using a characteristic variable mapping and the rotation speed Nlp, the actuation current Ilp, and the actuation voltage Vlp of the feed pump 52 and the tank fuel temperature Tftnk acquired in Step S450 when the termination condition for the relief pressure control is satisfied (Step S460). Then, the electronic control unit 70 terminates the execution of the relief pressure control (Step S470), and terminates this routine.

The characteristic variable mapping uses, as input variables, the rotation speed Nlp, the actuation current Ilp, and the actuation voltage Vlp of the feed pump 52 and the tank fuel temperature Tftnk when the termination condition for the relief pressure control is satisfied, and outputs the characteristic variable Alp of the feed pump 52. The characteristic variable mapping is stored in the flash memory 74.

The process of Step S460 is performed as follows. The rotation speed Nlp, the actuation current Ilp, and the actuation voltage Vlp of the feed pump 52 and the tank fuel temperature Tftnk when the termination condition for the relief pressure control is satisfied are set to input variables x[1] to x[4] of the characteristic variable mapping and the characteristic variable Alp of the feed pump 52 is derived by applying the set input variables x[1] to x[4] to the characteristic variable mapping. In the embodiment, the characteristic variable mapping is set as, for example, a map or an arithmetic expression through manual experiment or analysis. In this manner, the characteristic variable Alp of the feed pump 52 can be set.

In the characteristic variable setting routine of FIG. 5, when the system is activated after the fuel is supplied to the fuel tank 51, the execution of the tank fuel temperature estimation routine of FIG. 2, the alcohol concentration estimation routine of FIG. 3, and the low-fuel pressure estimation routine of FIG. 8 is prohibited until the termination condition for the relief pressure control is satisfied. Thus, it is possible to avoid the low-accuracy estimation of the tank fuel temperature Tftnk, the alcohol concentration Cfal, and the low-fuel pressure Pflo.

Next, the process for estimating the pressure loss Llo of the low-pressure supply pipe 53 is described with reference to the pressure loss estimation routine of FIG. 6. This routine is repeatedly executed by the electronic control unit 70. In the pressure loss estimation routine of FIG. 6, the CPU 71 of the electronic control unit 70 first acquires a consumed flow rate Qfec of the engine 12 (Step S500). For the consumed flow rate Qfec of the engine 12, the CPU 71 acquires a value calculated as the sum of the consumed flow rates Qfpc and Qfdc of the port injection valve 25 and the direct injection valve 26 that are based on the fuel injection amounts Qfp and Qfd of the port injection valve 25 and the direct injection valve 26.

The CPU 71 of the electronic control unit 70 estimates a pressure loss Llo of the low-pressure supply pipe 53 by using a pressure loss mapping and the consumed flow rate Qfec of the engine 12, which is acquired in Step S500 (Step S510). Then, the CPU 71 terminates this routine. The pressure loss mapping uses, as inputs, input variables including the consumed flow rate Qfec of the engine 12, and outputs the pressure loss Llo of the low-pressure supply pipe 53. The pressure loss mapping is stored in the flash memory 74.

The process of Step S510 is performed as follows. The consumed flow rate Qfec of the engine 12 is set to an input variable x[1] of the pressure loss mapping and the pressure loss Llo of the low-pressure supply pipe 53 is derived by applying the set input variable x[1] to the pressure loss mapping. In the embodiment, the pressure loss mapping is set as, for example, a map or an arithmetic expression through manual experiment or analysis. In this manner, the pressure loss Llo of the low-pressure supply pipe 53 can be estimated.

Next, the process for estimating the high-pressure pump fuel temperature Tfhp is described with reference to the high-pressure pump fuel temperature estimation routine of FIG. 7. This routine is repeatedly executed by the electronic control unit 70. In the high-pressure pump fuel temperature estimation routine of FIG. 7, the CPU 71 of the electronic control unit 70 first acquires an intake air temperature Ta, an oil temperature Toil, a rotation speed Ne, and a load factor KL of the engine 12, an intake flow rate Qfhpi of the high-pressure pump 57 (flow rate of the fuel supplied from the low-pressure supply pipe 53 to the high-pressure pump 57), a vehicle speed V, and a previously estimated high-pressure pump fuel temperature (previous Tfhp) (Step S600).

For the intake air temperature Ta of the engine 12, the CPU 71 of the electronic control unit 70 acquires a value detected by the airflow meter 23a. For the oil temperature Toil, the CPU 71 of the electronic control unit 70 acquires a value detected by the oil temperature sensor 42. For the rotation speed Ne, the CPU 71 of the electronic control unit 70 acquires a value calculated based on the crank angle θcr detected by the crank position sensor 15. For the load factor KL, the CPU 71 of the electronic control unit 70 acquires a value calculated based on the intake air amount Qa and the rotation speed Ne of the engine 12. For the intake flow rate Qfhpi of the high-pressure pump 57, the CPU 71 of the electronic control unit 70 acquires a consumed flow rate Qfdc of the direct injection valve 26 that is calculated based on the target injection amount Qfd* of the direct injection valve 26 under the assumption that the consumed flow rate Qfdc of the direct injection valve 26 is equal to the intake flow rate Qfhpi of the high-pressure pump 57. For the vehicle speed V, the CPU 71 of the electronic control unit 70 acquires a value detected by the vehicle speed sensor 82.

The CPU 71 of the electronic control unit 70 estimates a high-pressure pump fuel temperature Tfhp by using a high-pressure pump fuel temperature mapping and the intake air temperature Ta, the oil temperature Toil, the rotation speed Ne, and the load factor KL of the engine 12, the intake flow rate Qfhpi of the high-pressure pump 57, the vehicle speed V, and the previously estimated high-pressure pump fuel temperature (previous Tfhp), which are acquired in Step S600 (Step S610). Then, the CPU 71 terminates this routine.

The high-pressure pump fuel temperature mapping uses, as inputs, input variables including the intake air temperature Ta, the oil temperature Toil, the rotation speed Ne, and the load factor KL of the engine 12, the intake flow rate Qfhpi of the high-pressure pump 57, the vehicle speed V, and the previously estimated high-pressure pump fuel temperature (previous Tfhp), and outputs the high-pressure pump fuel temperature Tfhp. The high-pressure pump fuel temperature mapping is stored in the flash memory 74.

The process of Step S610 is performed as follows. The intake air temperature Ta, the oil temperature Toil, the rotation speed Ne, and the load factor KL of the engine 12, the intake flow rate Qfhpi of the high-pressure pump 57, the vehicle speed V, and the previously estimated high-pressure pump fuel temperature (previous Tfhp) are set to input variables x[1] to x[7] of the high-pressure pump fuel temperature mapping and the high-pressure pump fuel temperature Tfhp is derived by applying the set input variables x[1] to x[7] to the high-pressure pump fuel temperature mapping. In the embodiment, the high-pressure pump fuel temperature mapping is a neural network similarly to the tank fuel temperature mapping. In this manner, the high-pressure pump fuel temperature Tfhp can be estimated. Since a fuel temperature sensor need not be provided in the high-pressure pump 57, the number of components and costs can be reduced. A method for generating the high-pressure pump fuel temperature mapping is described later.

Next, the process for estimating the low-fuel pressure Pflo and the base value Pflobs and the pulsation component Pflopl of the low-fuel pressure Pflo is described with reference to the low-fuel pressure estimation routine of FIG. 8. This routine is repeatedly executed by the electronic control unit 70 except when the execution is prohibited through the characteristic variable setting routine of FIG. 5. The relief pressure control is executed when the execution is prohibited through the characteristic variable setting routine of FIG. 5. In the embodiment, the low-fuel pressure Pflo and the base value Pflobs are therefore estimated to be the threshold Pflolim, and the pulsation component Pflopl is estimated to be substantially 0.

In the low-fuel pressure estimation routine of FIG. 8, the CPU 71 of the electronic control unit 70 first acquires a rotation speed Nlp, an actuation current Ilp, an actuation voltage Vlp, and a characteristic variable Alp of the feed pump 52, a consumed flow rate Qfec of the engine 12, a tank fuel temperature Tftnk, an alcohol concentration Cfal of the fuel, a tank internal pressure Ptnk, a pressure loss Llo of the low-pressure supply pipe 53, and a high-pressure pump fuel temperature Tfhp (Step S700).

For each of the rotation speed Nlp, the actuation current Ilp, and the actuation voltage Vlp of the feed pump 52, the CPU 71 of the electronic control unit 70 acquires a value detected by the condition detector 52a. For the characteristic variable Alp of the feed pump 52, the CPU 71 of the electronic control unit 70 acquires a value estimated through the characteristic variable setting routine of FIG. 5. For the fuel amount Qftnk in the fuel tank 51, the CPU 71 of the electronic control unit 70 acquires a value detected by the fuel amount sensor 51a. For the consumed flow rate Qfec of the engine 12, the CPU 71 of the electronic control unit 70 acquires a value calculated as the sum of the consumed flow rates Qfpc and Qfdc of the port injection valve 25 and the direct injection valve 26 that are based on the fuel injection amounts Qfp and Qfd of the port injection valve 25 and the direct injection valve 26. For the tank fuel temperature Tftnk, the CPU 71 of the electronic control unit 70 acquires a value estimated through the tank fuel temperature estimation routine of FIG. 2. For the alcohol concentration Cfal of the fuel, the CPU 71 of the electronic control unit 70 acquires a value estimated through the alcohol concentration estimation routine of FIG. 3. For the tank internal pressure Ptnk, the CPU 71 of the electronic control unit 70 acquires a value estimated through the tank internal pressure estimation routine of FIG. 4. For the pressure loss Llo of the low-pressure supply pipe 53, the CPU 71 of the electronic control unit 70 acquires a value estimated through the pressure loss estimation routine of FIG. 6. For the high-pressure pump fuel temperature Tfhp, the CPU 71 of the electronic control unit 70 acquires a value estimated through the high-pressure pump fuel temperature estimation routine of FIG. 7.

The CPU 71 of the electronic control unit 70 acquires current and past cam angles $\theta ci$, $\theta ci1$, and $\theta ci2$, current and past rotation speeds Ne, Ne1, and Ne2, and current and past load factors KL, KL1, and KL2 of the engine 12, current and past discharge flow rates Qfhpo, Qfhpo1, and Qfhpo2 of the high-pressure pump 57, and current and past high-fuel pressures Pfhi, Pfhi1, and Pfhi2 (Step S710).

For the current and past cam angles $\theta ci$, $\theta ci1$, and $\theta ci2$, the CPU 71 of the electronic control unit 70 acquires a latest value detected by the cam position sensor 44, a value detected by the cam position sensor 44 at a time earlier by a predetermined period $\Delta t3$, and a value detected by the cam position sensor 44 at a time earlier by a predetermined period $\Delta t4$. For example, the predetermined period $\Delta t3$ is about several milliseconds, and the predetermined period $\Delta t4$ is twice as long as the predetermined period $\Delta t3$. For the current and past rotation speeds Ne, Ne1, and Ne2, the CPU 71 of the electronic control unit 70 acquires a latest value, a value calculated at a time earlier by the predetermined period $\Delta t3$, and a value calculated at a time earlier by the predetermined period $\Delta t4$ based on the crank angles $\theta cr$ sequentially detected by the crank position sensor 15. For the current and past load factors KL, KL1, and KL2, the CPU 71 of the electronic control unit 70 acquires a latest value, a value calculated at a time earlier by the predetermined period $\Delta t3$, and a value calculated at a time earlier by the predetermined period $\Delta t4$ based on the sequentially calculated rotation speeds Ne and the intake air amounts Qa sequentially detected by the airflow meter 23a. For each of the current and past discharge flow rates Qfhpo, Qfhpo1, and Qfhpo2 of the high-pressure pump 57, the CPU 71 of the electronic control unit 70 acquires a value calculated based on, for example, the intake flow rate Qfhpi of the high-pressure pump 57 (see Step S600) and the rotation speed of the intake cam shaft that is based on the cam angle θci detected by the cam position sensor 44. For the current and past high-fuel pressures Pfhi, Pfhi1, and Pfhi2, the CPU 71 of the electronic control unit 70 acquires a latest value detected by the fuel pressure sensor 58p, a value detected by the fuel pressure sensor 58p at a time earlier by the predetermined period Δt3, and a value detected by the fuel pressure sensor 58p at a time earlier by the predetermined period Δt4.

The CPU 71 of the electronic control unit 70 acquires a rotation speed variation amount ΔNlp, an actuation current variation amount ΔIlp, and an actuation voltage variation amount ΔVlp of the feed pump 52 and a consumed flow rate variation amount ΔQfec of the engine 12 (Step S720). In the embodiment, the CPU 71 of the electronic control unit 70 acquires, for each of the rotation speed variation amount ΔNlp, the actuation current variation amount ΔIlp, and the actuation voltage variation amount ΔVlp of the feed pump 52 and the consumed flow rate variation amount ΔQfec of the engine 12, a value calculated as a variation amount in a predetermined period Δt5 by using sequential values in the predetermined period Δt5 (values at individual times to a current time from a time that is earlier by the predetermined period Δt5) about each of the rotation speed Nlp, the actuation current Ilp, and the actuation voltage Vlp of the feed pump 52 and the consumed flow rate Qfec of the engine 12. The methods for acquiring the rotation speed Nlp, the actuation current Ilp, and the actuation voltage Vlp of the feed pump 52 and the consumed flow rate Qfec of the engine 12 are described above. For example, the predetermined period Δt5 is about 5 msec to 25 msec.

When various types of data are acquired as described above, the CPU 71 of the electronic control unit 70 estimates a base value Pflobs of the low-fuel pressure Pflo by using a base value mapping and the rotation speed Nlp, the actuation current Ilp, the actuation voltage Vlp, and the characteristic variable Alp of the feed pump 52, the consumed flow rate Qfec of the engine 12, the tank fuel temperature Tftnk, the alcohol concentration Cfal of the fuel, the tank internal pressure Ptnk, the pressure loss Llo of the low-pressure supply pipe 53, and the high-pressure pump fuel temperature Tfhp, which are acquired in Step S700 (Step S730).

The base value mapping uses, as inputs, input variables including the rotation speed Nlp, the actuation current Ilp, the actuation voltage Vlp, and the characteristic variable Alp of the feed pump 52, the consumed flow rate Qfec of the engine 12, the tank fuel temperature Tftnk, the alcohol concentration Cfal of the fuel, the tank internal pressure Ptnk, the pressure loss Llo of the low-pressure supply pipe 53, and the high-pressure pump fuel temperature Tfhp, and outputs the base value Pflobs. The base value mapping is stored in the flash memory 74.

The process of Step S730 is performed as follows. The rotation speed Nlp, the actuation current Ilp, the actuation voltage Vlp, and the characteristic variable Alp of the feed pump 52, the consumed flow rate Qfec of the engine 12, the tank fuel temperature Tftnk, the alcohol concentration Cfal of the fuel, the tank internal pressure Ptnk, the pressure loss Llo of the low-pressure supply pipe 53, and the high-pressure pump fuel temperature Tfhp are set to input variables x[1] to x[10] of the base value mapping and the base value Pflobs is derived by applying the set input variables x[1] to x[10] to the base value mapping. In the embodiment, the base value mapping is a neural network similarly to the tank fuel temperature mapping. In this manner, the base value Pflobs can be estimated. A method for generating the base value mapping is described later.

The CPU 71 of the electronic control unit 70 estimates a pulsation component Pflopl of the low-fuel pressure Pflo by using a pulsation mapping and the current and past cam angles θci, θci1, and θci2, the current and past rotation speeds Ne, Ne1, and Ne2, and the current and past load factors KL, KL1, and KL2 of the engine 12, the current and past discharge flow rates Qfhpo, Qfhpo1, and Qfhpo2 of the high-pressure pump 57, and the current and past high-fuel pressures Pfhi, Pfhi1, and Pfhi2, which are acquired in Step S710 (Step S740). As described above, during the driving of the high-pressure pump 57, the fuel pressure (pressure of the fuel) in the low-pressure supply pipe 53 and the fuel pressure in the high-pressure supply pipe 58 pulsate in response to the rotation of the engine 12 (rotation of the intake cam shaft). The pulsation component Pflopl reflects the pulsation.

The pulsation mapping uses, as inputs, input variables including the current and past cam angles θci, θci1, and θci2, the current and past rotation speeds Ne, Ne1, and Ne2, and the current and past load factors KL, KL1, and KL2 of the engine 12, the current and past discharge flow rates Qfhpo, Qfhpo1, and Qfhpo2 of the high-pressure pump 57, and the current and past high-fuel pressures Pfhi, Pfhi1, and Pfhi2, and outputs the pulsation component Pflopl. The pulsation mapping is stored in the flash memory 74.

The process of Step S740 is performed as follows. The current and past cam angles θci, θci1, and θci2, the current and past rotation speeds Ne, Ne1, and Ne2, and the current and past load factors KL, KL1, and KL2 of the engine 12, the current and past discharge flow rates Qfhpo, Qfhpo1, and Qfhpo2 of the high-pressure pump 57, and the current and past high-fuel pressures Pfhi, Pfhi1, and Pfhi2 are set to input variables x[1] to x[15] of the pulsation mapping and the pulsation component Pflopl is derived by applying the set input variables x[1] to x[15] to the pulsation mapping. In the embodiment, the pulsation mapping is a neural network similarly to the tank fuel temperature mapping. In this manner, the pulsation component Pflopl can be estimated. A method for generating the pulsation mapping is described later.

The CPU 71 of the electronic control unit 70 estimates a low-fuel pressure Pflo by using a low-fuel pressure mapping, the base value Pflobs, the pulsation component Pflopl, and the rotation speed variation amount ΔNlp, the actuation current variation amount ΔIlp, and the actuation voltage variation amount ΔVlp of the feed pump 52 and the consumed flow rate variation amount ΔQfec of the engine 12, which are acquired in Step S720 (Step S750). Then, the CPU 71 terminates this routine.

The low-fuel pressure mapping uses, as inputs, input variables including the base value Pflobs, the pulsation component Pflopl, the rotation speed variation amount ΔNlp, the actuation current variation amount ΔIlp, and the actuation voltage variation amount ΔVlp of the feed pump 52, and the consumed flow rate variation amount ΔQfec of the engine 12, and outputs the low-fuel pressure Pflo. The low-fuel pressure mapping is stored in the flash memory 74.

The process of Step S750 is performed as follows. The base value Pflobs, the pulsation component Pflopl, the rotation speed variation amount ΔNlp, the actuation current variation amount ΔIlp, and the actuation voltage variation amount ΔVlp of the feed pump 52, and the consumed flow rate variation amount ΔQfec of the engine 12 are set to input variables x[1] to x[6] of the low-fuel pressure mapping and the set input variables x[1] to x[6] are applied to the low-fuel pressure mapping. In the embodiment, the low-fuel pressure mapping is a neural network similarly to the tank fuel temperature mapping. In this manner, the low-fuel pressure Pflo can be estimated. Since a fuel pressure sensor need not be provided in the low-pressure supply pipe 53, the number of components and costs can be reduced. A method for generating the low-fuel pressure mapping is described later.

Figure 9:
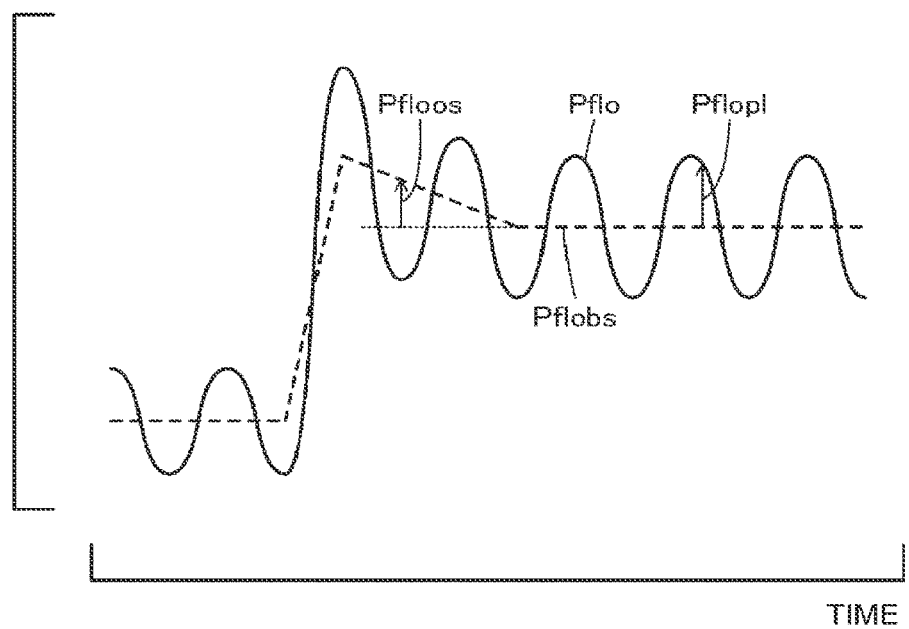
FIG. 9 is an explanatory drawing illustrating an example of a change in a low-fuel pressure Pflo.

FIG. 9 is an explanatory drawing illustrating an example of a change in the low-fuel pressure Pflo. As illustrated in FIG. 9, the low-fuel pressure Pflo pulsates across the base value Pflobs substantially at the center of amplitudes. When the low-fuel pressure Pflo increases, the base value Pflobs of the low-fuel pressure Pflo overshoots at a subsequent value (stabilized value). The inventors have found through, for example, experiment and analysis that an overshoot amount Pfloos of the base value Pflobs is determined based on the rotation speed variation amount ΔNlp, the actuation current variation amount ΔIlp, and the actuation voltage variation amount ΔVlp of the feed pump 52 and the consumed flow rate variation amount ΔQfec of the engine 12. In view of this, the low-fuel pressure Pflo in the embodiment is estimated based on the base value Pflobs, the pulsation component Pflopl, and the rotation speed variation amount ΔNlp, the actuation current variation amount ΔIlp, and the actuation voltage variation amount ΔVlp of the feed pump 52 and the consumed flow rate variation amount ΔQfec of the engine 12 (overshoot amount Pfloos that is based on those variation amounts). Thus, it is possible to estimate a low-fuel pressure Pflo that reflects the base value Pflobs, the pulsation component Pflopl, and the overshoot amount Pfloos. As a result, a fuel pressure sensor need not be provided in the low-pressure supply pipe 53, and thus the number of components and costs can be reduced.

Next, description is given of the methods for generating the tank fuel temperature mapping, the alcohol concentration mapping, the tank internal pressure mapping, the high-pressure pump fuel temperature mapping, the base value mapping, the pulsation mapping, and the low-fuel pressure mapping.

Figure 10:
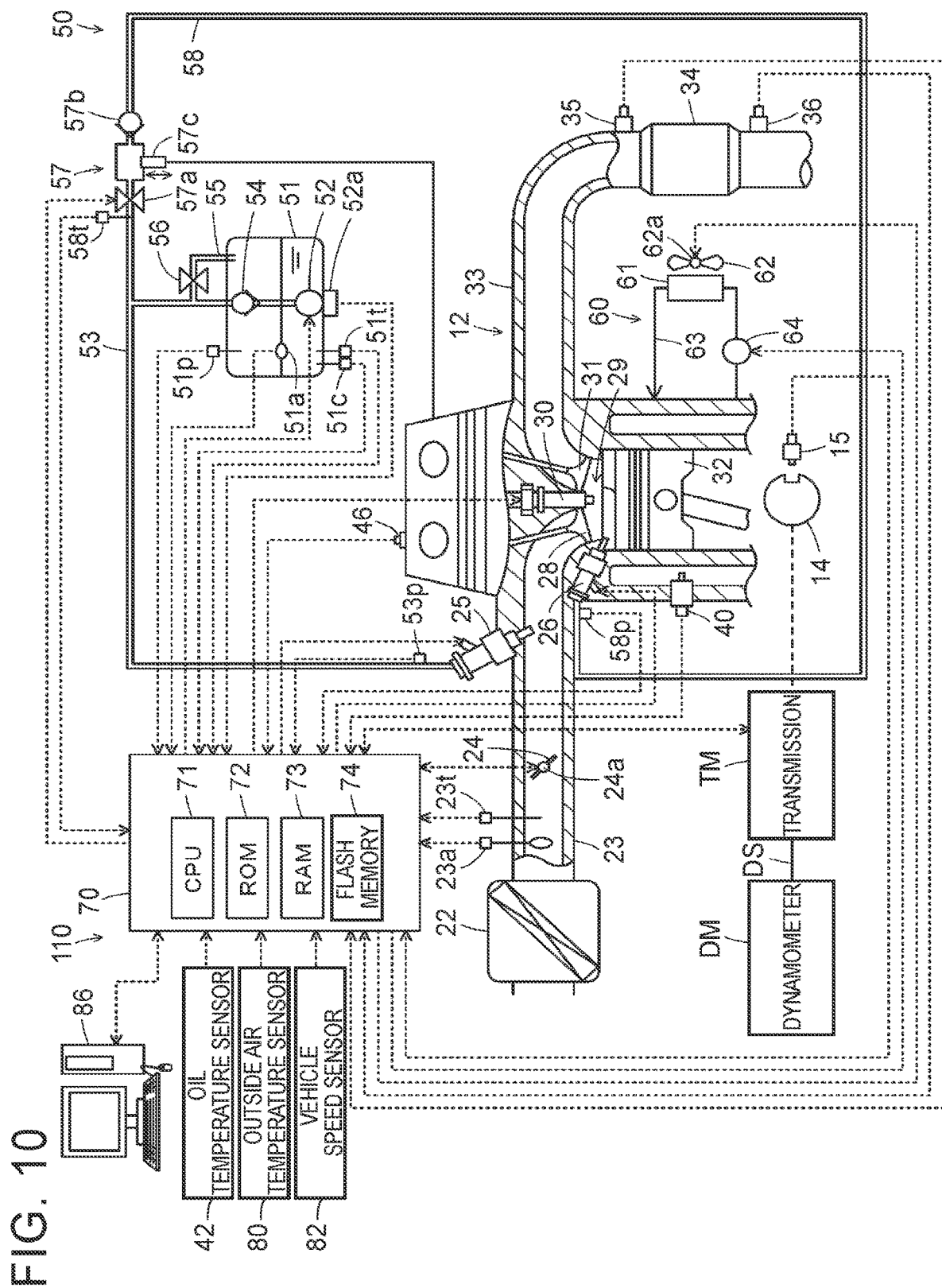
FIG. 10 is a structural diagram illustrating an overview of the structures of a testing device 110 and an analysis device 86 for generating mappings by machine learning.

FIG. 10 is a structural diagram illustrating an overview of the structures of a testing device 110 and an analysis device 86 for generating the mappings by machine learning. The hardware structure of the testing device 110 is similar to that of the vehicle 10 of FIG. 1 except that a dynamometer DM is attached to the driving shaft DS in place of the differential gear DF and the driving wheels DW, and a fuel temperature sensor 51t, an alcohol concentration sensor 51c, an internal pressure sensor 51p, a fuel pressure sensor 53p, and a fuel temperature sensor 58t are provided. Since the dynamometer DM is attached to the driving shaft DS in place of the driving wheels DW in the testing device 110, the vehicle speed sensor 82 estimates the vehicle speed V from a rotation speed of the driving shaft DS. The testing device 110 is housed in a facility, and tests can be conducted under various testing conditions (for example, conditions related to statuses of the engine 12, the fuel supply apparatus 50, the cooling apparatus 60, and the transmission TM, conditions related to an outside air temperature and an intake air temperature, and conditions related to traveling wind). The testing device HO may be travelable by attaching the differential gear DF and the driving wheels DW to the driving shaft DS similarly to the vehicle 10.

The fuel temperature sensor 51t is attached to the fuel tank 51, detects a tank fuel temperature as a detected tank fuel temperature Tftnkdt, and transmits the detected tank fuel temperature Tftnkdt to the electronic control unit 70. The internal pressure sensor 51p is attached to the fuel tank 51, detects a tank internal pressure as a detected tank internal pressure Ptnkdt, and transmits the detected tank internal pressure Ptnkdt to the electronic control unit 70. The fuel pressure sensor 53p is attached near the port injection valve 25 in the low-pressure supply pipe 53 (for example, a low-pressure delivery pipe), detects a low-fuel pressure as a detected low-fuel pressure Pflodt, and transmits the detected low-fuel pressure Pflodt to the electronic control unit 70. The fuel temperature sensor 58t is attached to the high-pressure pump 57 near the low-pressure supply pipe 53 (near the electromagnetic valve 57a), detects a high-pressure pump fuel temperature as a detected high-pressure pump fuel temperature Tfhpdt, and transmits the detected high-pressure pump fuel temperature Tfhpdt to the electronic control unit 70.

The analysis device 86 is a general-purpose computer including a CPU, a ROM, a RAM, a flash memory, a large-capacity storage device (for example, a hard disk drive (HDD) or a solid state drive (SSD)), input and output ports, and a communication port. An input device and a display device are connected to the analysis device 86. Examples of the input device include a mouse and a keyboard. The analysis device 86 is communicable with the electronic control unit 70 of the testing device 110.

Figure 11:
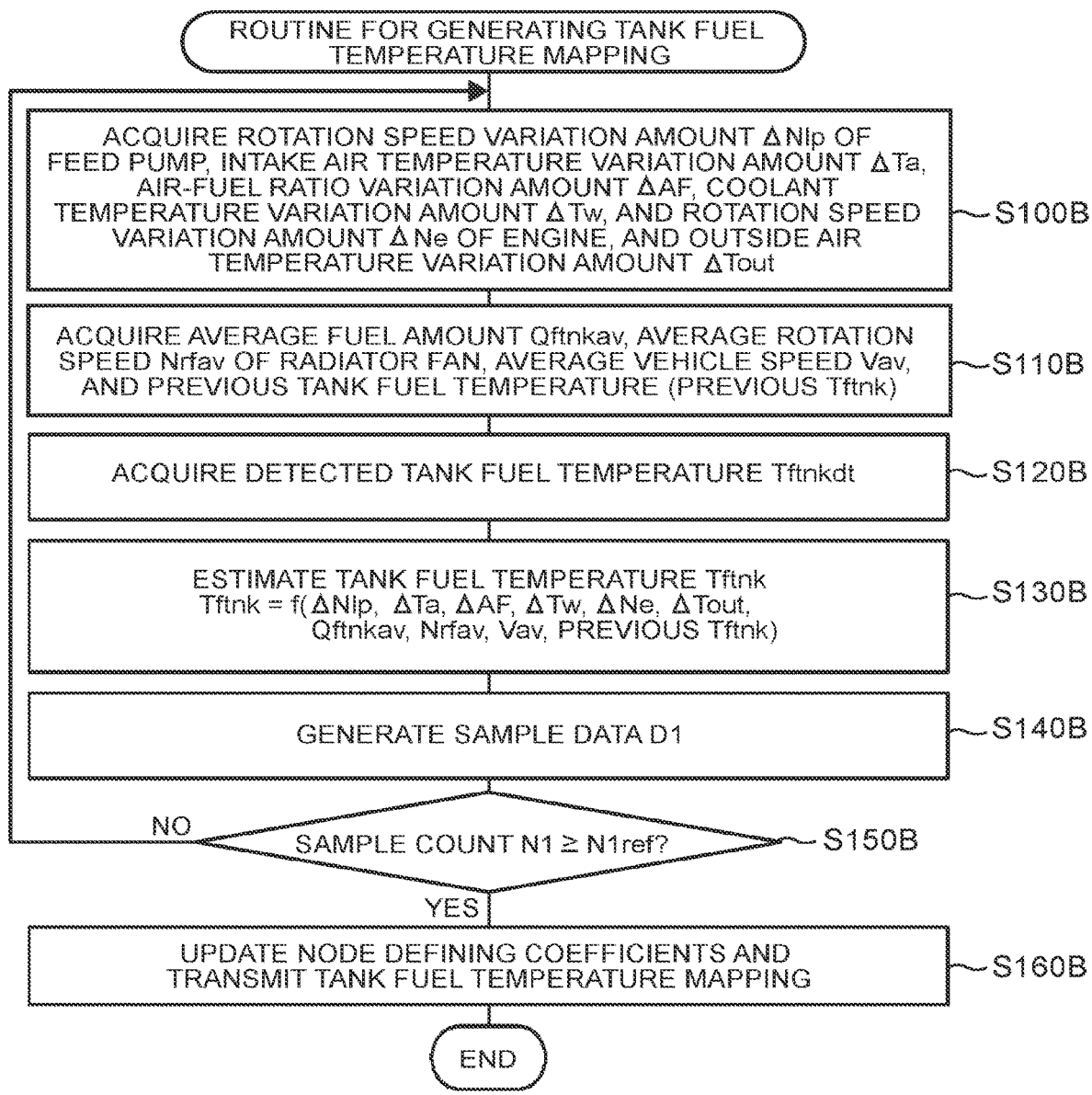
FIG. 11 is a flowchart illustrating an example of a routine for generating a tank fuel temperature mapping.
Figure 12:
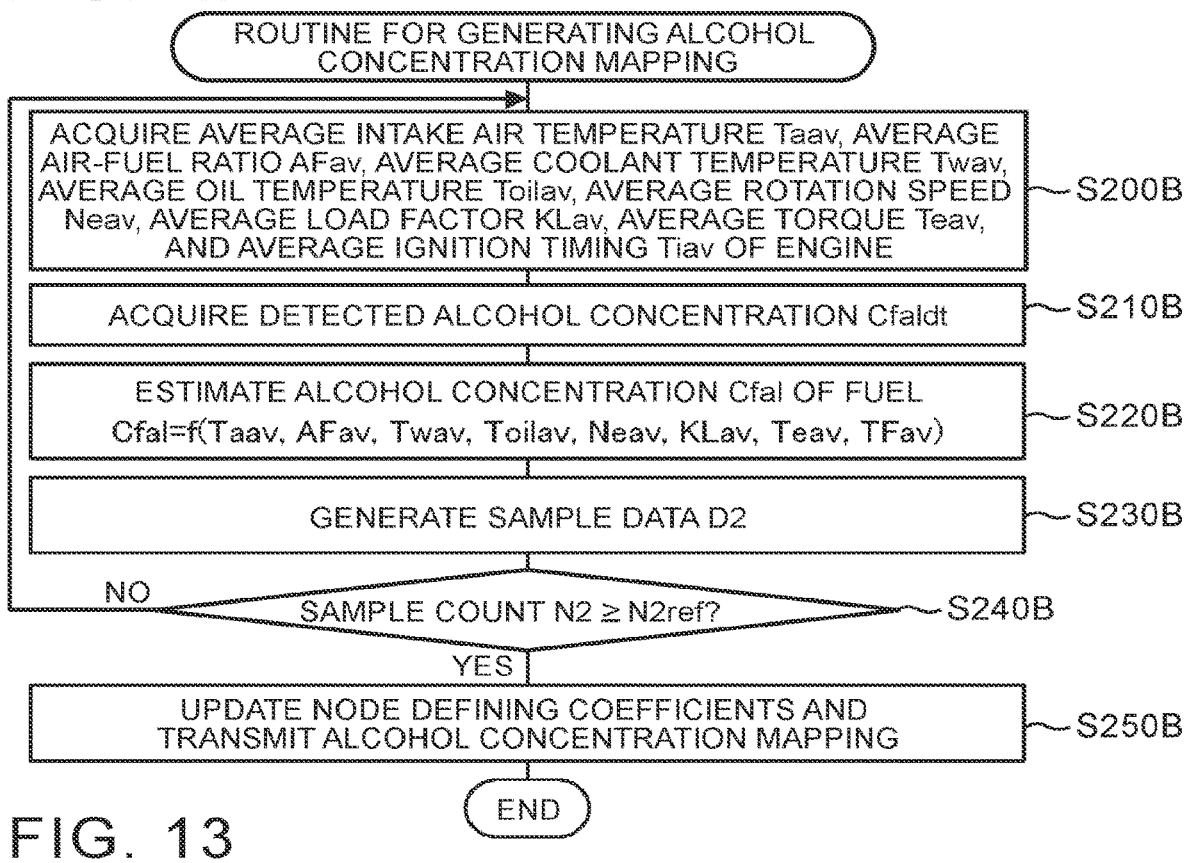
FIG. 12 is a flowchart illustrating an example of a routine for generating an alcohol concentration mapping.
Figure 13:
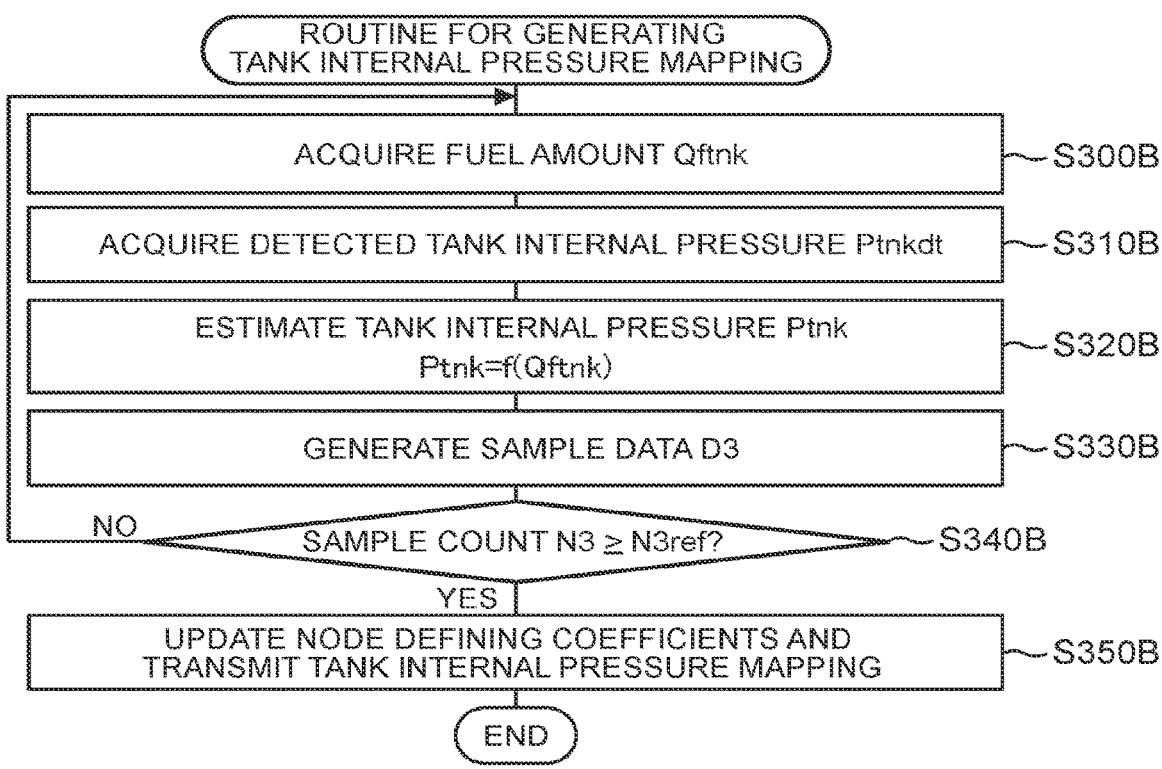
FIG. 13 is a flowchart illustrating an example of a routine for generating a tank internal pressure mapping.
Figure 14:
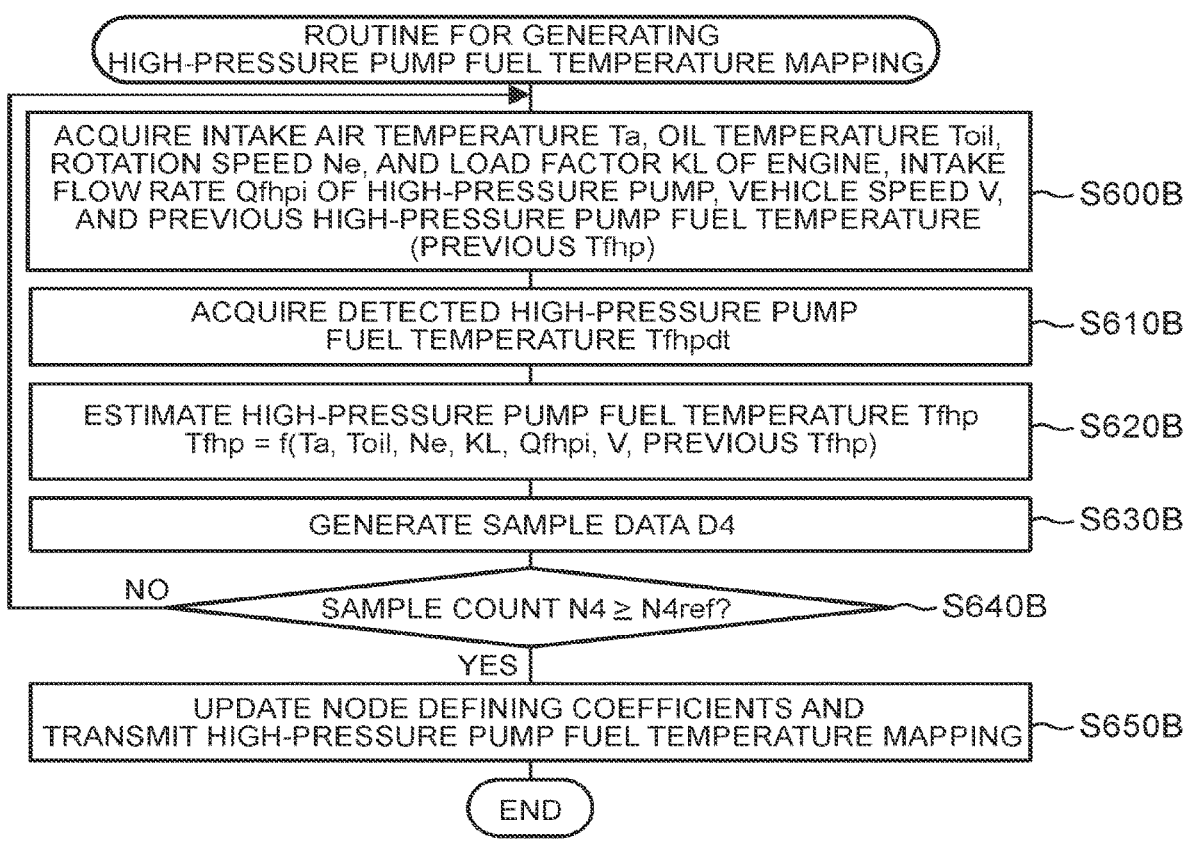
FIG. 14 is a flowchart illustrating an example of a routine for generating a high-pressure pump fuel temperature mapping.
Figure 15:
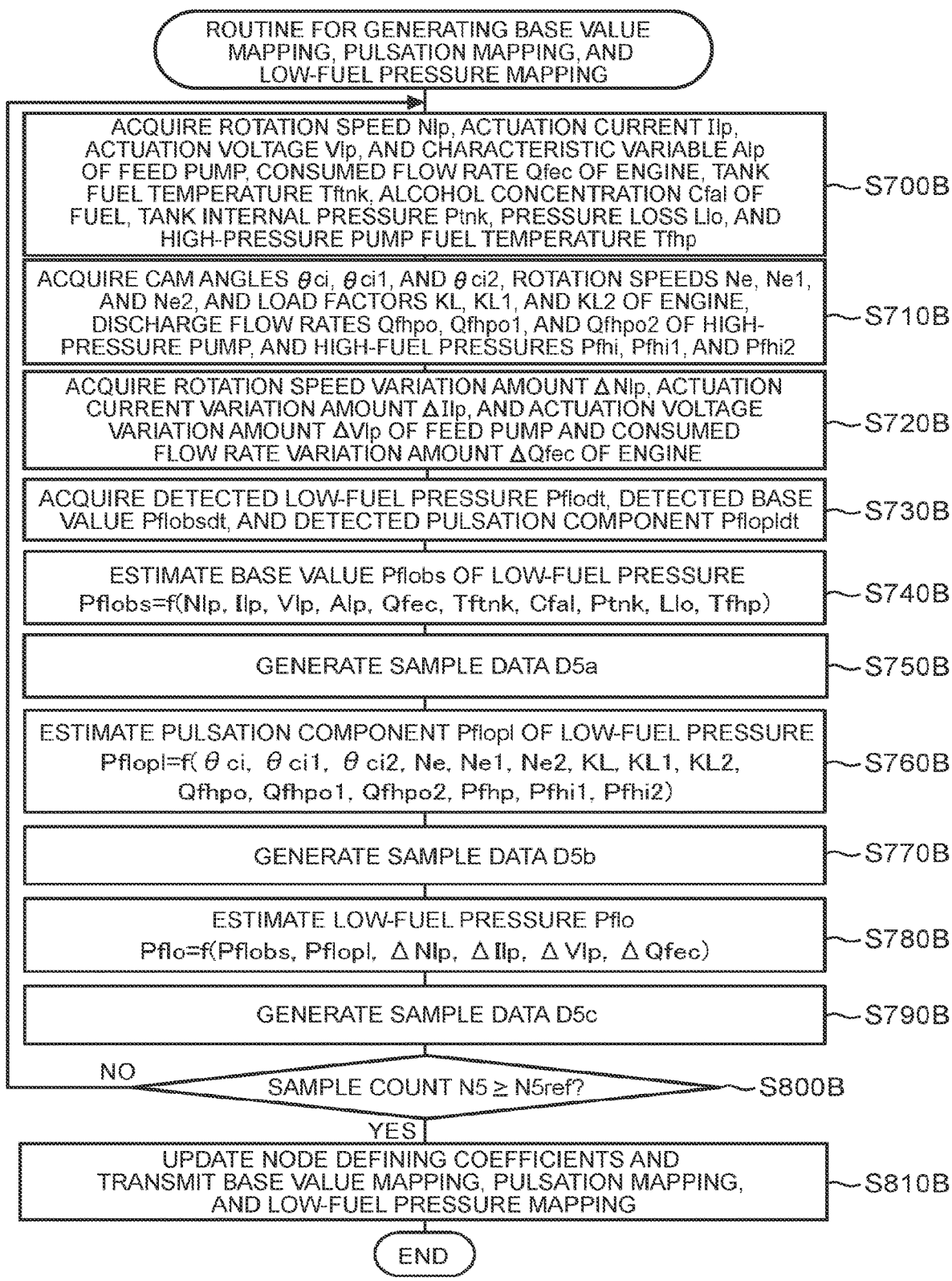
FIG. 15 is a flowchart illustrating an example of a routine for generating a base value mapping, a pulsation mapping, and a low-fuel pressure mapping.

FIG. 11 is a flowchart illustrating an example of a routine for generating the tank fuel temperature mapping. FIG. 12 is a flowchart illustrating an example of a routine for generating the alcohol concentration mapping. FIG. 13 is a flowchart illustrating an example of a routine for generating the tank internal pressure mapping. FIG. 14 is a flowchart illustrating an example of a routine for generating the high-pressure pump fuel temperature mapping. FIG. 15 is a flowchart illustrating an example of a routine for generating the base value mapping, the pulsation mapping, and the low-fuel pressure mapping. The CPU of the analysis device 86 reads programs stored in the ROM of the analysis device 86 and executes those routines. The routines are described below in sequence.

Description is given of the routine for generating the tank fuel temperature mapping in FIG. 11. In advance of the generation process, the inventors have found through, for example, experiment and analysis that the data acquired in Steps S100 and S110 of the tank fuel temperature estimation routine of FIG. 2 has a relationship with the tank fuel temperature Tftnk (former affects latter). Specifically, the inventors have found that, regarding heat quantity variables related to a heat quantity of fuel, a change amount per unit time affects the tank fuel temperature Tftnk, and regarding heat capacity variables related to a heat capacity and heat transfer of fuel, an average per unit time affects the tank fuel temperature Tftnk. The inventors have also found that the heat quantity variables include the rotation speed Nlp of the feed pump 52, the intake air temperature Ta, the air-fuel ratio AF, the coolant temperature Tw, and the rotation speed Ne of the engine 12, and the outside air temperature Tout, and the heat capacity variables include the fuel amount Qftnk in the fuel tank 51, the rotation speed Nrf of the radiator fan 62, and the vehicle speed V.

In the routine for generating the tank fuel temperature mapping in FIG. 11, the analysis device 86 first acquires, as training data, the same data as that in the processes of Steps S100 and S110 of the tank fuel temperature estimation routine of FIG. 2 (Steps S100B and S110B), and acquires a detected tank fuel temperature Tftnkdt as teaching data in the training data (Step S120B). For the detected tank fuel temperature Tftnkdt, the analysis device 86 acquires a value detected by the fuel temperature sensor 51t.

The analysis device 86 estimates a tank fuel temperature Tftnk similarly to the process of Step S120 of the tank fuel temperature estimation routine of FIG. 2 by using the training data other than the teaching data (data acquired in Steps S100B and S110B) and a tank fuel temperature mapping that is a neural network (Step S130B). The analysis device 86 generates sample data D1 by associating the training data other than the teaching data, the estimated tank fuel temperature Tftnk, and the detected tank fuel temperature Tftnkdt serving as the teaching data (Step S140B).

The analysis device 86 compares a count N1 of the sample data D1 and a threshold N1ref (Step S150B), and returns to Step S100B when the count N1 of the sample data D1 is smaller than the threshold N1ref. In the embodiment, the sample data D1 is collected while changing the testing condition.

When the count N1 of the sample data D1 is equal to or larger than the threshold N1ref in Step S150B, the analysis device 86 updates coefficients for defining input values of nodes in intermediate layers and an output layer (coefficient w[1, j, i] and the like; hereinafter referred to as "node defining coefficients") of the tank fuel temperature mapping that is the neural network, and transmits the tank fuel temperature mapping including the updated node defining coefficients to the electronic control unit 70 (Step S160B). Then, the analysis device 86 terminates this routine. For example, this process is performed by updating the node defining coefficients by using error backpropagation to reduce the sum of squares of errors between the detected tank fuel temperature Tftnkdt serving as the teaching data and the tank fuel temperature Tftnk estimated in Step S130B in the individual pieces of sample data D1. The electronic control unit 70 stores the tank fuel temperature mapping received from the analysis device 86 in the flash memory 74.

Next, description is given of the routine for generating the alcohol concentration mapping in FIG. 12. In advance of the generation process, the inventors have found through, for example, experiment and analysis that the data acquired in Step S200 of the alcohol concentration estimation routine of FIG. 3 has a relationship with the alcohol concentration Cfal (former affects latter).

In the routine for generating the alcohol concentration mapping in FIG. 12, the analysis device 86 first acquires, as training data, the same data as that in the process of Step S200 of the alcohol concentration estimation routine of FIG. 3 (Step S200B), and acquires a detected alcohol concentration Cfaldt as teaching data in the training data (Step S210B). For the detected alcohol concentration Cfaldt, the analysis device 86 acquires a value detected by the alcohol concentration sensor 51*c*.

The analysis device 86 estimates an alcohol concentration Cfal similarly to the process of Step S210 of the alcohol concentration estimation routine of FIG. 3 by using the training data other than the teaching data (data acquired in Step S200B) and an alcohol concentration mapping that is a neural network (Step S220B). The analysis device 86 generates sample data D2 by associating the training data other than the teaching data, the estimated alcohol concentration Cfal, and the detected alcohol concentration Cfaldt serving as the teaching data (Step S230B).

The analysis device 86 compares a count N2 of the sample data D2 and a threshold N2ref (Step S240B), and returns to Step S200B when the count N2 of the sample data D2 is smaller than the threshold N2ref. In the embodiment, the sample data D2 is collected while changing the testing condition.

When the count N2 of the sample data D2 is equal to or larger than the threshold N2ref in Step S240B, similarly to the process of Step S160B in the process for generating the tank fuel temperature mapping in FIG. 11, the analysis device 86 updates node defining coefficients of the alcohol concentration mapping that is the neural network, and transmits the alcohol concentration mapping including the updated node defining coefficients to the electronic control unit 70 (Step S250B). Then, the analysis device 86 terminates this routine. The electronic control unit 70 stores the alcohol concentration mapping received from the analysis device 86 in the flash memory 74.

Next, description is given of the routine for generating the tank internal pressure mapping in FIG. 13. In advance of the generation process, the inventors have found through, for example, experiment and analysis that the data acquired in Step S300 of the tank internal pressure estimation routine of FIG. 4 has a relationship with the tank internal pressure Ptnk (former affects latter).

In the routine for generating the tank internal pressure mapping in FIG. 13, the analysis device 86 first acquires, as training data, the same data as that in the process of Step S300 of the tank internal pressure estimation routine of FIG. 4, specifically, a fuel amount Qftnk in the fuel tank 51 (Step S300B), and acquires a detected tank internal pressure Ptnkdt as teaching data in the training data (Step S310B). For the detected tank internal pressure Ptnkdt, the analysis device 86 acquires a value detected by the internal pressure sensor 51*p*.

The analysis device 86 estimates a tank internal pressure Ptnk similarly to the process of Step S310 of the tank internal pressure estimation routine of FIG. 4 by using the training data other than the teaching data (fuel amount Qftnk) and a tank internal pressure mapping that is a neural network (Step S320B). The analysis device 86 generates sample data D3 by associating the training data other than the teaching data, the estimated tank internal pressure Ptnk, and the detected tank internal pressure Ptnkdt serving as the teaching data (Step S330B).

The analysis device 86 compares a count N3 of the sample data D3 and a threshold N3ref (Step S340B), and returns to Step S300B when the count N3 of the sample data D3 is smaller than the threshold N3ref. In the embodiment, the sample data D3 is collected while changing the testing condition (fuel amount Qftnk in the fuel tank 51).

When the count N3 of the sample data D3 is equal to or larger than the threshold N3ref in Step S340B, similarly to the process of Step S160B in the process for generating the tank fuel temperature mapping in FIG. 11, the analysis device 86 updates node defining coefficients of the tank internal pressure mapping that is the neural network, and transmits the tank internal pressure mapping including the updated node defining coefficients to the electronic control unit 70 (Step S350B). Then, the analysis device 86 terminates this routine. The electronic control unit 70 stores the tank internal pressure mapping received from the analysis device 86 in the flash memory 74.

Next, description is given of the routine for generating the high-pressure pump fuel temperature mapping in FIG. 14. In advance of the generation process, the inventors have found through, for example, experiment and analysis that the data acquired in Step S600 of the high-pressure pump fuel temperature estimation routine of FIG. 7 has a relationship with the high-pressure pump fuel temperature Tfhp (former affects latter).

In the routine for generating the high-pressure pump fuel temperature mapping in FIG. 14, the analysis device 86 first acquires, as training data, the same data as that in the process of Step S600 of the high-pressure pump fuel temperature estimation routine of FIG. 7 (Step S600B), and acquires a detected high-pressure pump fuel temperature Tfhpdt as teaching data in the training data (Step S610B). For the detected high-pressure pump fuel temperature Tfhpdt, the analysis device 86 acquires a value detected by the fuel temperature sensor 58t.

The analysis device 86 estimates a high-pressure pump fuel temperature Tfhp similarly to the process of Step S610 of the high-pressure pump fuel temperature estimation routine of FIG. 7 by using the training data other than the teaching data (data acquired in Step S600B) and a high-pressure pump fuel temperature mapping that is a neural network (Step S620B). The analysis device 86 generates sample data D4 by associating the training data other than the teaching data, the estimated high-pressure pump fuel temperature Tfhp, and the detected high-pressure pump fuel temperature Tfhpdt serving as the teaching data (Step S630B).

The analysis device 86 compares a count N4 of the sample data D4 and a threshold N4ref (Step S640B), and returns to Step S600B when the count N4 of the sample data D4 is smaller than the threshold N4ref. In the embodiment, the sample data D4 is collected while changing the testing condition.

When the count N4 of the sample data D4 is equal to or larger than the threshold N4ref in Step S640B, similarly to the process of Step S160B in the process for generating the tank fuel temperature mapping in FIG. 11, the analysis device 86 updates node defining coefficients of the high-pressure pump fuel temperature mapping that is the neural network, and transmits the high-pressure pump fuel temperature mapping including the updated node defining coefficients to the electronic control unit 70 (Step S650B). Then, the analysis device 86 terminates this routine. The electronic control unit 70 stores the high-pressure pump fuel temperature mapping received from the analysis device 86 in the flash memory 74.

Next, description is given of the routine for generating the base value mapping, the pulsation mapping, and the low-fuel pressure mapping in FIG. 15. In advance of the generation processes, the inventors have found through, for example, experiment and analysis that the data acquired in Step S700 of the low-fuel pressure estimation routine of FIG. 8 has a relationship with the base value Pflobs (former affects latter). The inventors have also found that the data acquired in Step S710 has a relationship with the pulsation component Pflopl. The inventors have also found that the base value Pflobs, the pulsation component Pflopl, and the data acquired in Step S720 have a relationship with the low-fuel pressure Pflo.

In the routine for generating the base value mapping, the pulsation mapping, and the low-fuel pressure mapping in FIG. 15, the analysis device 86 first executes the same processes as the processes of Steps S700 to S720 of the low-fuel pressure estimation routine of FIG. 8 (Steps S700B to S720B). Then, the analysis device 86 acquires a detected low-fuel pressure Pflodt, a detected base value Pflobsdt, and a detected pulsation component Pflopldt (Step S730B). For the detected low-fuel pressure Pflodt, the analysis device 86 acquires a value detected by the fuel pressure sensor 53p. For the detected base value Pflobsdt, the analysis device 86 acquires a value obtained by performing a gentle-change process (smoothing or rating) for the detected low-fuel pressure Pflodt. For the detected pulsation component Pflopldt, the analysis device 86 acquires a value obtained by subtracting the detected base value Pflobsdt from the detected low-fuel pressure Pflodt.

The analysis device 86 sets the data acquired in Step S700B as training data for the base value mapping, and sets the detected base value Pflobsdt acquired in Step S730B as teaching data in the training data for the base value mapping. The analysis device 86 estimates a base value Pflobs similarly to the process of Step S730 of the low-fuel pressure estimation routine of FIG. 8 by using the training data other than the teaching data for the base value mapping and a base value mapping that is a neural network (Step S740B). The analysis device 86 generates sample data D5a by associating the training data other than the teaching data for the base value mapping, the estimated base value Pflobs, and the detected base value Pflobsdt serving as the teaching data for the base value mapping (Step S750B).

The analysis device 86 sets the data acquired in Step S710B as training data for the pulsation mapping, and sets the detected pulsation component Pflopldt acquired in Step S730B as teaching data in the training data for the pulsation mapping. The analysis device 86 estimates a pulsation component Pflopl similarly to the process of Step S740 of the low-fuel pressure estimation routine of FIG. 8 by using the training data other than the teaching data for the pulsation mapping and a pulsation mapping that is a neural network (Step S760B). The analysis device 86 generates sample data D5b by associating the training data other than the teaching data for the pulsation mapping, the estimated pulsation component Pflopl, and the detected pulsation component Pflopldt serving as the teaching data for the pulsation mapping (Step S770B).

The analysis device 86 sets the base value Pflobs estimated in Step S740B, the pulsation component Pflopl estimated in Step S760B, and the data acquired in Step S720B as training data for the low-fuel pressure mapping, and sets the detected low-fuel pressure Pflodt acquired in Step S730B as teaching data in the training data for the low-fuel pressure mapping. The analysis device 86 estimates a low-fuel pressure Pflo similarly to the process of Step S750 of the low-fuel pressure estimation routine of FIG. 8 by using the training data other than the teaching data for the low-fuel pressure mapping and a low-fuel pressure mapping that is a neural network (Step S780B). The analysis device 86 generates sample data D5c by associating the training data other than the teaching data for the low-fuel pressure mapping, the estimated low-fuel pressure Pflo, and the detected low-fuel pressure Pflodt serving as the teaching data for the low-fuel pressure mapping (Step S790B). The analysis device 86 may estimate the low-fuel pressure Pflo by setting the detected base value Pflobsdt and the detected pulsation component Pflopldt as the training data in place of the base value Pflobs estimated in Step S740B and the pulsation component Pflopl estimated in Step S760B.

The analysis device 86 compares a count N5 of the pieces of sample data D5a, D5b, and D5c and a threshold N5ref (Step S800B), and returns to Step S700B when the sample data count N5 is smaller than the threshold N5ref. In the embodiment, the pieces of sample data are collected while changing the testing conditions.

When the sample data count N5 is equal to or larger than the threshold N5ref in Step S800B, similarly to the process of Step S160B in the process for generating the tank fuel temperature mapping in FIG. 11, the analysis device 86 updates node defining coefficients of the base value mapping, the pulsation mapping, and the low-fuel pressure mapping that are the neural networks, and transmits the base value mapping, the pulsation mapping, and the low-fuel pressure mapping each including the updated node defining coefficients to the electronic control unit 70 (Step S810B). Then, the analysis device 86 terminates this routine. The electronic control unit 70 stores the base value mapping, the pulsation mapping, and the low-fuel pressure mapping received from the analysis device 86 in the flash memory 74.

In the vehicle 10 of the embodiment described above, the electronic control unit 70 of the vehicle 10 serving as the fuel type estimation system estimates the alcohol concentration Cfal of the fuel by using the alcohol concentration mapping and the average intake air temperature Taav, the average air-fuel ratio AFav, the average coolant temperature Twav, the average oil temperature Toilav, the average rotation speed Neav, the average load factor KLav, the average torque Teav, and the average ignition timing Tiav of the engine 12. In this manner, the alcohol concentration Cfal can be estimated. Since the alcohol concentration sensor 51c (see FIG. 10) need not be provided in the fuel tank 51, the number of components and costs can be reduced.

The electronic control unit 70 estimates the base value Pflobs by using the base value mapping, the rotation speed Nlp, the actuation current Ilp, the actuation voltage Vlp, and the characteristic variable Alp of the feed pump 52, the consumed flow rate Qfec of the engine 12, the tank fuel temperature Tftnk, the alcohol concentration Cfal of the fuel, the tank internal pressure Ptnk, the pressure loss Llo of the low-pressure supply pipe 53, and the high-pressure pump fuel temperature Tfhp. The electronic control unit 70 estimates the pulsation component Pflopl by using the pulsation mapping, the current and past cam angles θci, θci1, and θci2, the current and past rotation speeds Ne, Ne1, and Ne2, and the current and past load factors KL, KL1, and KL2 of the engine 12, the current and past discharge flow rates Qfhpo, Qfhpo1, and Qfhpo2 of the high-pressure pump 57, and the current and past high-fuel pressures Pfhi, Pfhi1, and Pfhi2. The electronic control unit 70 estimates the low-fuel pressure Pflo by using the low-fuel pressure mapping, the base value Pflobs, the pulsation component Pflopl, the rotation speed variation amount ΔNlp, the actuation current variation amount ΔIlp, and the actuation voltage variation amount ΔVlp of the feed pump 52, and the consumed flow rate variation amount ΔQfec of the engine 12. In this manner, it is possible to estimate the low-fuel pressure Pflo that reflects the base value Pflobs, the pulsation component Pflopl, and the overshoot amount Pfloos. Since the fuel pressure sensor 53p (see FIG. 10) need not be provided in the low-pressure supply pipe 53, the number of components and costs can be reduced.

The electronic control unit 70 estimates the tank fuel temperature Tftnk by using the tank fuel temperature mapping, the rotation speed variation amount ΔNlp of the feed pump 52, the intake air temperature variation amount ΔTa, the air-fuel ratio variation amount ΔAF, the coolant temperature variation amount ΔTw, and the rotation speed variation amount ΔNe of the engine 12, the outside air temperature variation amount ΔTout, the average fuel amount Qftnkav in the fuel tank 51, the average rotation speed Nrfav of the radiator fan 62, the average vehicle speed Vav, and the previously estimated tank fuel temperature (previous Tftnk). In this manner, the tank fuel temperature Tftnk can be estimated. Since the fuel temperature sensor 51t (see FIG. 10) need not be provided in the fuel tank 51, the number of components and costs can be reduced.

The electronic control unit 70 of the vehicle 10 estimates the tank internal pressure Ptnk by using the tank internal pressure mapping and the fuel amount Qftnk in the fuel tank 51. In this manner, the tank internal pressure Ptnk can be estimated. Since the internal pressure sensor 51p (see FIG. 10) need not be provided in the fuel tank 51, the number of components and costs can be reduced.

The electronic control unit 70 sets the characteristic variable Alp of the feed pump 52 by using the characteristic variable mapping and the rotation speed Nlp, the actuation current Ilp, and the actuation voltage Vlp of the feed pump 52 and the tank fuel temperature Tftnk when the termination condition for the relief pressure control is satisfied. In this manner, the characteristic variable Alp of the feed pump 52 can be estimated.

The electronic control unit 70 estimates the pressure loss Llo of the low-pressure supply pipe 53 by using the pressure loss mapping and the consumed flow rate Qfec of the engine 12. In this manner, the pressure loss Llo of the low-pressure supply pipe 53 can be estimated.

The electronic control unit 70 estimates the high-pressure pump fuel temperature Tfhp by using the high-pressure pump fuel temperature mapping, the intake air temperature Ta, the oil temperature Toil, the rotation speed Ne, and the load factor KL of the engine 12, the intake flow rate Qfhpi of the high-pressure pump 57, the vehicle speed V, and the previously estimated high-pressure pump fuel temperature (previous Tfhp). In this manner, the high-pressure pump fuel temperature Tfhp can be estimated. Since the fuel temperature sensor 58t (see FIG. 10) need not be provided in the high-pressure pump 57, the number of components and costs can be reduced.

In the vehicle 10 of the embodiment, the inputs to the tank fuel temperature mapping for use in the tank fuel temperature estimation routine of FIG. 2 include the data acquired in Steps S100 and S110. Details of the data acquired in Step S100 are the rotation speed variation amount ΔNlp of the feed pump 52, the intake air temperature variation amount ΔTa, the air-fuel ratio variation amount ΔAF, the coolant temperature variation amount ΔTw, and the rotation speed variation amount ΔNe of the engine 12, and the outside air temperature variation amount ΔTout. Details of the data acquired in Step S110 are the average fuel amount Qftnkav in the fuel tank 51, the average rotation speed Nrfav of the radiator fan 62, the average vehicle speed Vav, and the previously estimated tank fuel temperature (previous Tftnk).

The inputs to the tank fuel temperature mapping may include, as a value related to the rotation speed variation amount ΔNlp of the feed pump 52, a variation amount ΔQ in the predetermined period Δt1 about the target discharge flow rate Qflpo*, the target rotation speed Nlp*, or the target duty Dlp* to be used for controlling the feed pump 52. In addition to the rotation speed variation amount ΔNlp of the feed pump 52 or its related value, the inputs may include at least a part of, for example, the actuation current variation amount ΔIlp and the actuation voltage variation amount ΔVlp of the feed pump 52.

The inputs to the tank fuel temperature mapping may include only a part of the intake air temperature variation amount ΔTa, the air-fuel ratio variation amount ΔAF, the coolant temperature variation amount ΔTw, and the rotation speed variation amount ΔNe of the engine 12. In addition to at least a part of those variation amounts, the inputs may include a variation amount in the predetermined period Δt1 about at least a part of, for example, the intake air amount Qa, the oil temperature Toil, the load factor KL, the torque Te, and the ignition timing Ti of the engine 12 and the target injection amounts Qfp* and Qfd* and the fuel injection amounts Qfp and Qfd of the port injection valve 25 and the direct injection valve 26.

The inputs to the tank fuel temperature mapping may include at least a part of the average fuel amount Qftnkav in the fuel tank 51, the average rotation speed Nrfav of the radiator fan 62, and the average vehicle speed Vav, or may include none of those values. The inputs may include the fuel amount Qftnk in place of the average fuel amount Qftnkav in the fuel tank 51. In place of the average rotation speed Nrfav of the radiator fan 62, the inputs may include the rotation speed Nrf of the radiator fan 62, a target rotation speed Nrf* to be used for controlling the radiator fan 62, or an average of the target rotation speeds Nrf* in the predetermined period Δt1. The inputs may include the vehicle speed V in place of the average vehicle speed Vav.

Figure 16:
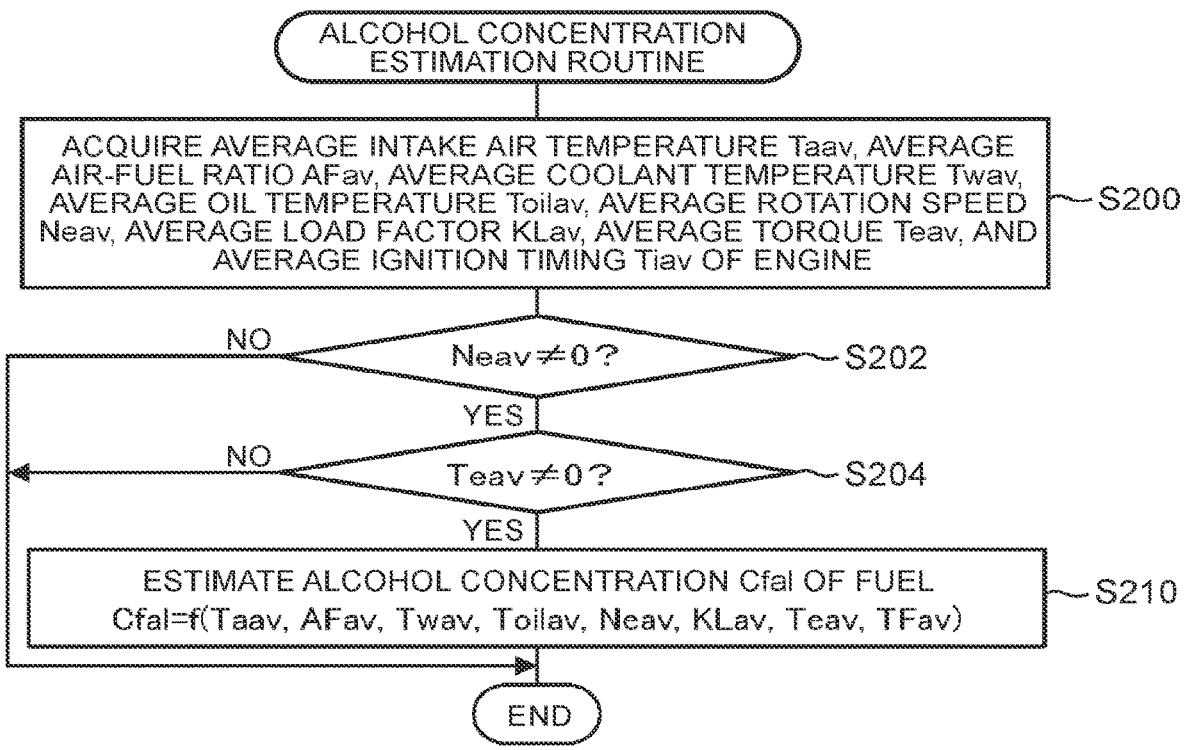
FIG. 16 is a flowchart illustrating an example of an alcohol concentration estimation routine.

In the vehicle 10 of the embodiment, the electronic control unit 70 estimates the alcohol concentration Cfal through the alcohol concentration estimation routine of FIG. 3. Instead, the alcohol concentration Cfal may be estimated through an alcohol concentration estimation routine of FIG. 16. The routine of FIG. 16 is identical to the routine of FIG. 3 except that processes of Steps S202 and S204 are added. In the routine of FIG. 16, processes identical to those in the routine of FIG. 3 are represented by the same step numbers to omit their detailed description.

In the alcohol concentration estimation routine of FIG. 16, when data is input in Step S200, the electronic control unit 70 determines whether the average rotation speed Neav and the average torque Teav of the engine 12 are 0 (Steps S202 and S204). When neither the average rotation speed Neav nor the average torque Teav of the engine 12 is 0, the electronic control unit 70 estimates the alcohol concentration Cfal of the fuel by using the alcohol concentration mapping (Step S210), and terminates this routine.

When the average rotation speed Neav of the engine 12 is 0 in Step S202 or when the average torque Teav of the engine 12 is 0 in Step S204, the electronic control unit 70 terminates this routine without estimating the alcohol concentration Cfal. When the average rotation speed Neav or the average torque Teav of the engine 12 is 0, that is, a part of the inputs to the alcohol concentration mapping is 0 in a case where the alcohol concentration mapping is a neural network, there is a possibility that the alcohol concentration Cfal cannot be estimated appropriately. In this modified example, the electronic control unit 70 does not estimate the alcohol concentration Cfal when the average rotation speed Neav or the average torque Teav of the engine 12 is 0. Thus, it is possible to avoid the low-accuracy estimation of the alcohol concentration Cfal.

In the alcohol concentration estimation routine of FIG. 16, the alcohol concentration Cfal is not estimated when the average rotation speed Neav or the average torque Teav of the engine 12 is 0. However, there may be employed such a case that the alcohol concentration Cfal is not estimated when the average rotation speed Neav and the average torque Teav of the engine 12 are 0.

In the vehicle 10 of the embodiment, the inputs to the alcohol concentration mapping for use in the alcohol concentration estimation routines of FIG. 3 and FIG. 16 include the data acquired in Step S200. Details of the data acquired in Step S200 are the average intake air temperature Taav, the average air-fuel ratio AFav, the average coolant temperature Twav, the average oil temperature Toilav, the average rotation speed Neav, the average load factor KLav, the average torque Teav, and the average ignition timing Tiav of the engine 12.

The inputs to the alcohol concentration mapping may include only a part of the average intake air temperature Taav, the average air-fuel ratio AFav, the average coolant temperature Twav, the average oil temperature Toilav, the average rotation speed Neav, the average load factor KLav, the average torque Teav, and the average ignition timing Tiav of the engine 12. In place of the average intake air temperature Taav, the average air-fuel ratio AFav, the average coolant temperature Twav, the average oil temperature Toilav, the average rotation speed Neav, the average load factor KLav, the average torque Teav, and the average ignition timing Tiav of the engine 12, the inputs may include at least a part of the intake air temperature Ta, the air-fuel ratio AF, the coolant temperature Tw, the oil temperature Toil, the rotation speed Ne, the load factor KL, the torque Te, and the ignition timing Ti of the engine 12.

Figure 17:
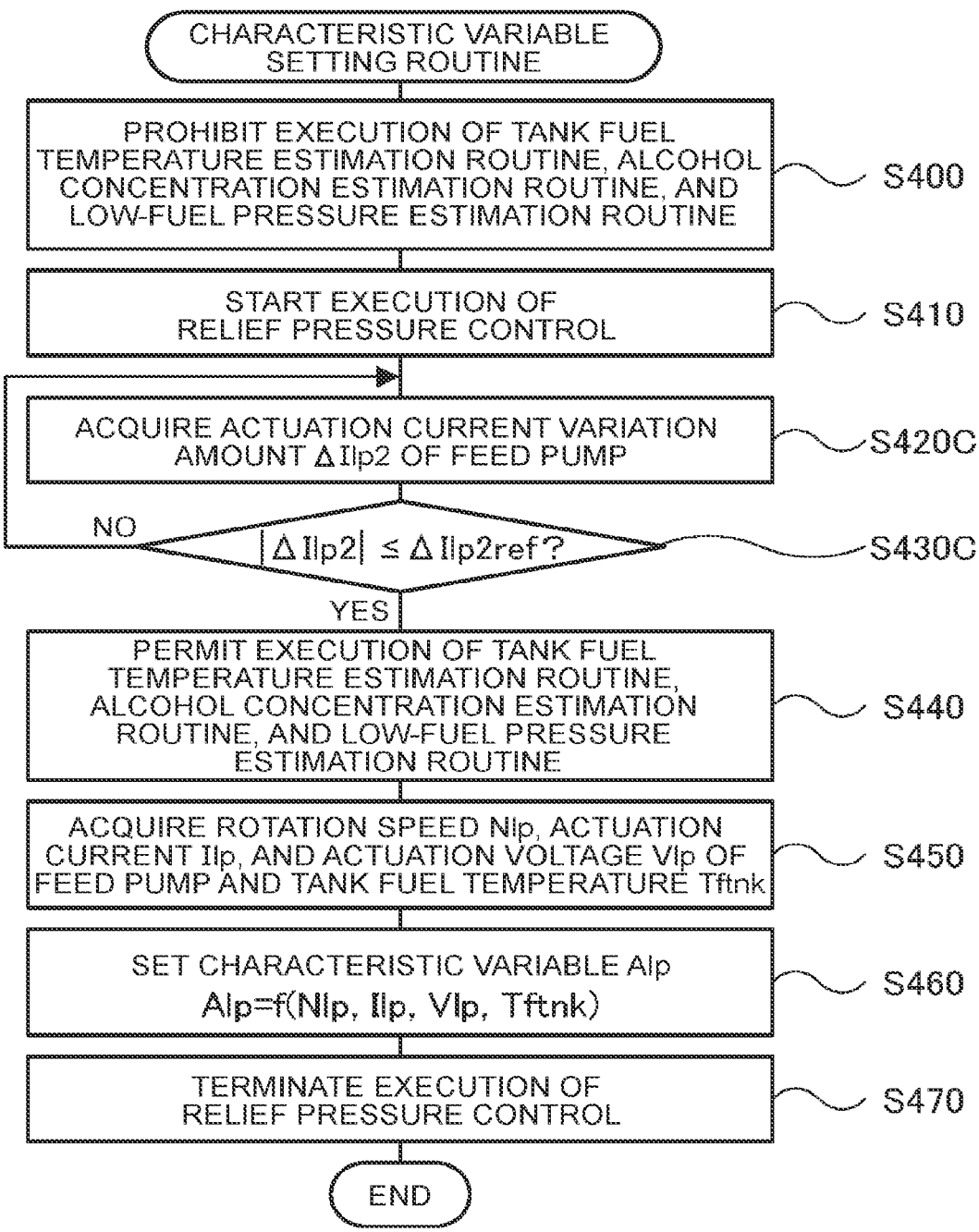
FIG. 17 is a flowchart illustrating an example of a characteristic variable setting routine.

In the vehicle 10 of the embodiment, the electronic control unit 70 executes the characteristic variable setting routine of FIG. 5. Instead, a characteristic variable setting routine of FIG. 17 may be executed. The characteristic variable setting routine of FIG. 17 is identical to the characteristic variable setting routine of FIG. 5 except that the processes of Steps S420 and S430 are replaced with processes of Steps S420C and S430C. In the routine of FIG. 17, processes identical to those in the routine of FIG. 5 are represented by the same step numbers to omit their detailed description.

In the characteristic variable setting routine of FIG. 17, when the execution of the relief pressure control is started in Step S410, the CPU 71 of the electronic control unit 70 acquires an actuation current variation amount ΔIlp2 of the feed pump 52 (Step S420C). For the actuation current variation amount ΔIlp2 of the feed pump 52, the CPU 71 of the electronic control unit 70 acquires a value calculated as a variation amount of the actuation current Ilp of the feed pump 52 in a predetermined period Δt6. The method for acquiring the actuation current Ilp of the feed pump 52 is described above. For example, the predetermined period Δt6 is about 20 μsec to 100 μsec.

When the data is acquired as described above, the CPU 71 of the electronic control unit 70 determines whether an absolute value of the actuation current variation amount ΔIlp2 of the feed pump 52 is equal to or smaller than a threshold ΔIlp2ref (Step S430C). The threshold ΔIlp2ref is used for determining whether the actuation current Ilp of the feed pump 52 has sufficiently converged. In this modified example, the condition that the absolute value of the actuation current variation amount ΔIlp2 of the feed pump 52 is equal to or smaller than the threshold ΔIlp2ref is used as the termination condition for the relief pressure control.

When the absolute value of the actuation current variation amount ΔIlp2 of the feed pump 52 is larger than the threshold ΔIlp2ref in Step S430C, the CPU 71 of the electronic control unit 70 determines that the termination condition for the relief pressure control is not satisfied, and returns to Step S420C. The CPU 71 of the electronic control unit 70 repeatedly executes the processes of Steps S420C and S430C. When the absolute value of the actuation current variation amount ΔIlp2 of the feed pump 52 is equal to or smaller than the threshold ΔIlp2ref in Step S430C, the CPU 71 of the electronic control unit 70 determines that the termination condition for the relief pressure control is satisfied, and executes the processes of Step S440 and afterwards.

Figure 18:
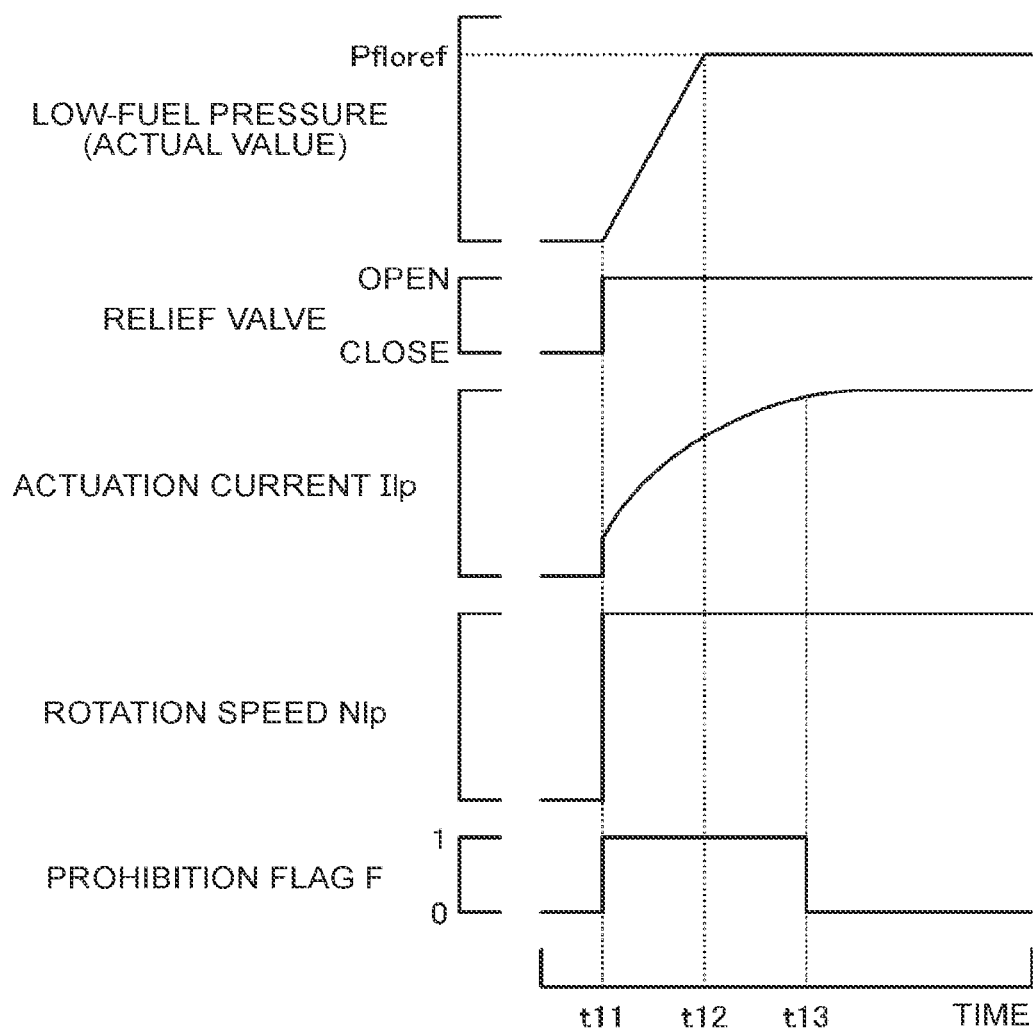
FIG. 18 is an explanatory drawing illustrating an example of changes in a fuel pressure (actual value) in a low-pressure supply pipe 53, an actuation current Ilp and a rotation speed Nlp of a feed pump 52, and a prohibition flag F when the system is activated after fuel is supplied to a fuel tank 51.

FIG. 18 is an explanatory drawing illustrating an example of changes in the fuel pressure (actual value) in the low-pressure supply pipe 53, the actuation current Ilp and the rotation speed Nlp of the feed pump 52, and a prohibition flag F when the system is activated after the fuel is supplied to the fuel tank 51. The prohibition flag F indicates whether the execution of the tank fuel temperature estimation routine of FIG. 2, the alcohol concentration estimation routine of FIG. 3, and the low-fuel pressure estimation routine of FIG. 8 is prohibited. When the system is activated after the fuel is supplied to the fuel tank 51 (time t11), the electronic control unit 70 switches the prohibition flag F from 0 to 1, and starts the execution of the relief pressure control. When the fuel pressure (actual value) in the low-pressure supply pipe 53 is equal to or higher than the threshold Pflolim (time t12), the relief valve 56 is opened. When the absolute value of the actuation current variation amount $\Delta$Ilp2 of the feed pump 52 is then equal to or smaller than the threshold $\Delta$Ilp2ref, the electronic control unit 70 determines that the termination condition for the relief pressure control is satisfied, and switches the prohibition flag F from 1 to 0.

In the vehicle 10 of the embodiment and the modified examples, when the system is activated after the fuel is supplied to the fuel tank 51, the electronic control unit 70 prohibits the execution of the tank fuel temperature estimation routine of FIG. 2, the alcohol concentration estimation routine of FIG. 3, and the low-fuel pressure estimation routine of FIG. 8 through the characteristic variable setting routine of FIG. 5 or FIG. 17 until the termination condition for the relief pressure control is satisfied. However, there may be employed such a case that the execution of at least a part of the routines is not prohibited in the period before the termination condition is satisfied. That is, the electronic control unit 70 may estimate at least a part of the tank fuel temperature Tftnk, the alcohol concentration Cfal, and the low-fuel pressure Pflo (including the base value Pflobs and the pulsation component Pflopl) in the period before the termination condition is satisfied.

In the vehicle 10 of the embodiment and the modified examples, when the system is activated after the fuel is supplied to the fuel tank 51, the electronic control unit 70 executes the characteristic variable setting routine of FIG. 5 or FIG. 17. The applicable embodiment is not limited to this case. For example, the electronic control unit 70 may execute the characteristic variable setting routine of FIG. 5 or FIG. 17 every time the vehicle 10 travels a predetermined distance (for example, about several hundred kilometers to several thousand kilometers). In this case, the execution of the tank fuel temperature estimation routine of FIG. 2, the alcohol concentration estimation routine of FIG. 3, the high-pressure pump fuel temperature estimation routine of FIG. 7, and the low-fuel pressure estimation routine of FIG. 8 need not be prohibited because the fuel in the fuel tank 51 does not change.

In the vehicle 10 of the embodiment, the inputs to the high-pressure pump fuel temperature mapping for use in the high-pressure pump fuel temperature estimation routine of FIG. 7 include the data acquired in Step S600. Details of the data acquired in Step S600 are the intake air temperature Ta, the oil temperature Toil, the rotation speed Ne, and the load factor KL of the engine 12, the intake flow rate Qfhpi of the high-pressure pump 57, the vehicle speed V, and the previously estimated high-pressure pump fuel temperature (previous Tfhp). The inputs to the high-pressure pump fuel temperature mapping may include only a part of those values.

In the vehicle 10 of the embodiment, the electronic control unit 70 estimates the base value Pflobs by using the base value mapping, estimates the pulsation component Pflopl by using the pulsation mapping, and estimates the low-fuel pressure Pflo by using the low-fuel pressure mapping. The electronic control unit 70 may estimate the low-fuel pressure Pflo without estimating the pulsation component Pflopl.

Figure 19:
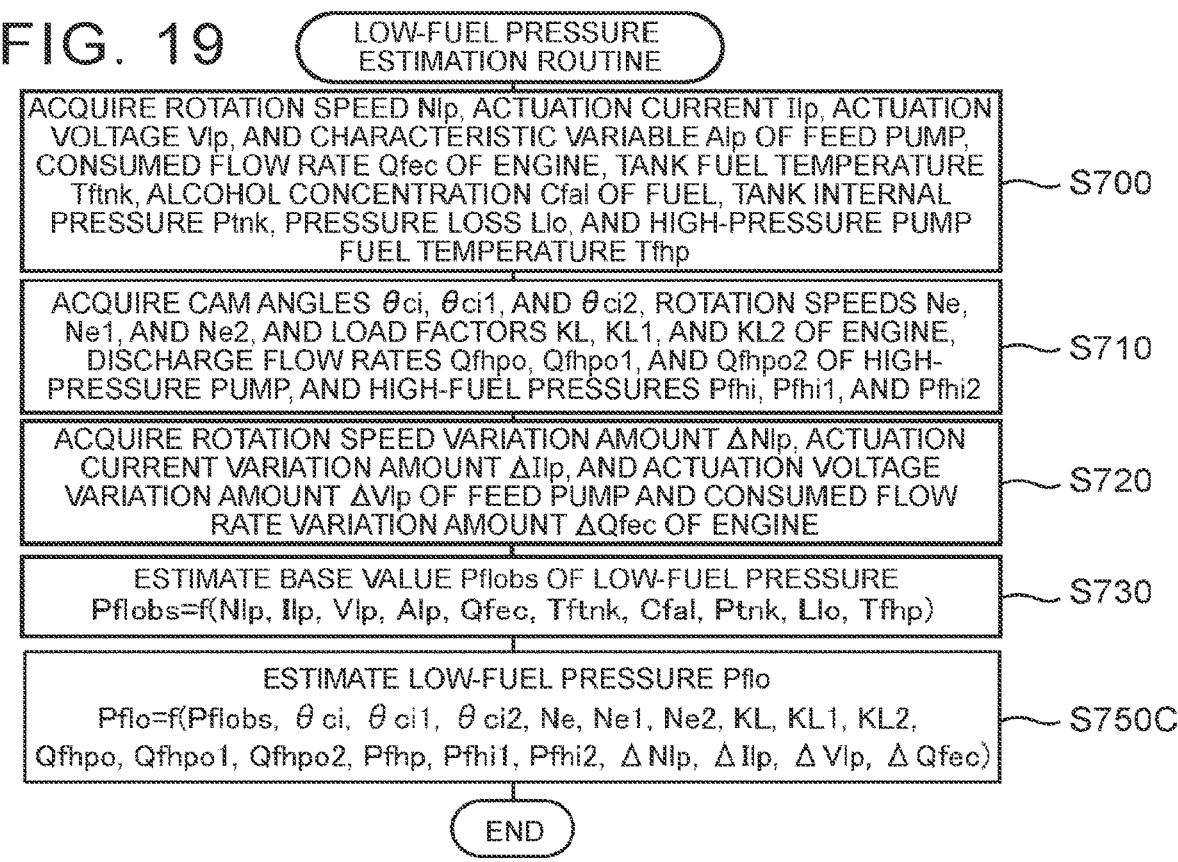
FIG. 19 is a flowchart illustrating an example of a low-fuel pressure estimation routine.

FIG. 19 is a flowchart illustrating an example of a low-fuel pressure estimation routine in this case. This routine is identical to the low-fuel pressure estimation routine of FIG. 8 except that the process of Step S740 is omitted and the process of Step S750 is replaced with a process of Step S750C. In the routine of FIG. 19, processes identical to those in the routine of FIG. 8 are represented by the same step numbers to omit their detailed description.

In the low-fuel pressure estimation routine of FIG. 19, when the base value Pflobs is estimated in Step S730, the electronic control unit 70 estimates the low-fuel pressure Pflo by using a second low-fuel pressure mapping, the base value Pflobs, and the data acquired in Steps S710 and S720 (Step S750C). Then, the electronic control unit 70 terminates this routine.

The second low-fuel pressure mapping uses, as inputs, input variables including the base value Pflobs, the current and past cam angles $\theta$ci, $\theta$ci1, and $\theta$ci2, the current and past rotation speeds Ne, Ne1, and Ne2, and the current and past load factors KL, KL1, and KL2 of the engine 12, the current and past discharge flow rates Qfhpo, Qfhpo1, and Qfhpo2 of the high-pressure pump 57, the current and past high-fuel pressures Pfhi, Pfhi1, and Pfhi2, the rotation speed variation amount $\Delta$Nlp, the actuation current variation amount $\Delta$Ilp, and the actuation voltage variation amount $\Delta$Vlp of the feed pump 52, and the consumed flow rate variation amount $\Delta$Qfec of the engine 12, and outputs the low-fuel pressure Pflo. The second low-fuel pressure mapping is stored in the flash memory 74.

The process of Step S750C is performed as follows. The base value Pflobs, the current and past cam angles $\theta$ci, $\theta$ci1, and $\theta$ci2, the current and past rotation speeds Ne, Ne1, and Ne2, and the current and past load factors KL, KL1, and KL2 of the engine 12, the current and past discharge flow rates Qfhpo, Qfhpo1, and Qfhpo2 of the high-pressure pump 57, the current and past high-fuel pressures Pfhi, Pfhi1, and Pfhi2, the rotation speed variation amount $\Delta$Nlp, the actuation current variation amount $\Delta$Ilp, and the actuation voltage variation amount $\Delta$Vlp of the feed pump 52, and the consumed flow rate variation amount $\Delta$Qfec of the engine 12 are set to input variables x[1] to x[20] of the second low-fuel pressure mapping and the set input variables x[1] to x[20] are applied to the second low-fuel pressure mapping.

In this modified example, the second low-fuel pressure mapping is a neural network similarly to the tank fuel temperature mapping. Thus, the process of Step S750C is a process for deriving the low-fuel pressure Pflo by applying the input variables x[1] to x[20] to the second low-fuel pressure mapping that is the neural network. Also in this case, the low-fuel pressure Pflo can be estimated similarly to the embodiment. The second low-fuel pressure mapping can be generated by a method similar to that for the low-fuel pressure mapping.

In the vehicle 10 of the embodiment, the electronic control unit 70 estimates the base value Pflobs by using the base value mapping, estimates the pulsation component Pflopl by using the pulsation mapping, and estimates the low-fuel pressure Pflo by using the low-fuel pressure mapping. The electronic control unit 70 may estimate the low-fuel pressure Pflo without estimating the base value Pflobs and the pulsation component Pflopl.

Figure 20:
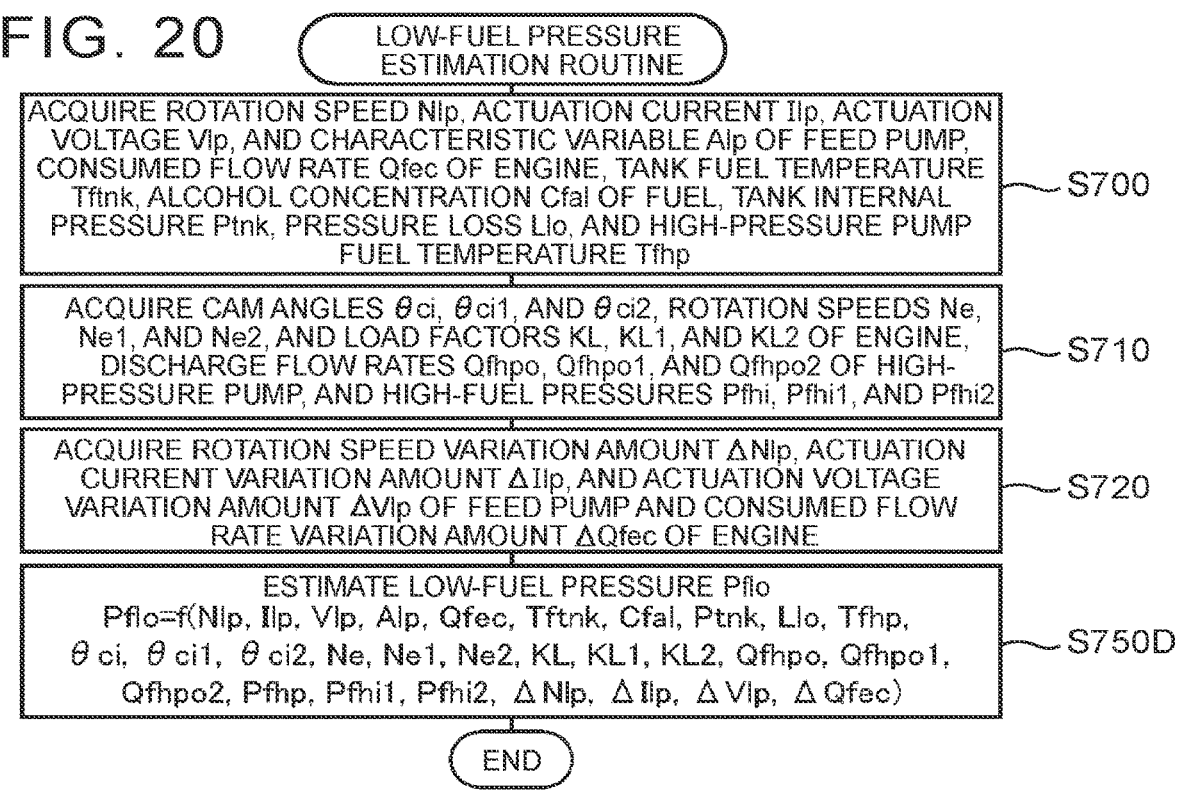
FIG. 20 is a flowchart illustrating an example of a low-fuel pressure estimation routine.

FIG. 20 is a flowchart illustrating an example of a low-fuel pressure estimation routine in this case. This routine is identical to the low-fuel pressure estimation routine of FIG. 8 except that the processes of Steps S730 and S740 are omitted and the process of Step S750 is replaced with a process of Step S750D. In the routine of FIG. 20, processes identical to those in the routine of FIG. 8 are represented by the same step numbers to omit their detailed description.

In the low-fuel pressure estimation routine of FIG. 20, when the data is acquired in the processes of Steps S700 to S720, the electronic control unit 70 estimates the low-fuel pressure Pflo by using the acquired data and a third low-fuel pressure mapping (Step S750D). Then, the electronic control unit 70 terminates this routine.

The third low-fuel pressure mapping uses, as inputs, input variables including the rotation speed Nlp, the actuation current Ilp, the actuation voltage Vlp, and the characteristic variable Alp of the feed pump 52, the consumed flow rate Qfec of the engine 12, the tank fuel temperature Tftnk, the alcohol concentration Cfal of the fuel, the tank internal pressure Ptnk, the pressure loss Llo of the low-pressure supply pipe 53, the high-pressure pump fuel temperature Tfhp, the current and past cam angles $\theta ci$, $\theta ci1$, and $\theta ci2$, the current and past rotation speeds Ne, Ne1, and Ne2, and the current and past load factors KL, KL1, and KL2 of the engine 12, the current and past discharge flow rates Qfhpo, Qfhpo1, and Qfhpo2 of the high-pressure pump 57, the current and past high-fuel pressures Pfhi, Pfhi1, and Pfhi2, the rotation speed variation amount $\Delta$Nlp, the actuation current variation amount $\Delta$Ilp, and the actuation voltage variation amount $\Delta$Vlp of the feed pump 52, and the consumed flow rate variation amount $\Delta$Qfec of the engine 12, and outputs the low-fuel pressure Pflo. The third low-fuel pressure mapping is stored in the flash memory 74.

The process of Step S750D is performed as follows. The rotation speed Nlp, the actuation current Ilp, the actuation voltage Vlp, and the characteristic variable Alp of the feed pump 52, the consumed flow rate Qfec of the engine 12, the tank fuel temperature Tftnk, the alcohol concentration Cfal of the fuel, the tank internal pressure Ptnk, the pressure loss Llo of the low-pressure supply pipe 53, the high-pressure pump fuel temperature Tfhp, the current and past cam angles $\theta ci$, $\theta ci1$, and $\theta ci2$, the current and past rotation speeds Ne, Ne1, and Ne2, and the current and past load factors KL, KL1, and KL2 of the engine 12, the current and past discharge flow rates Qfhpo, Qfhpo1, and Qfhpo2 of the high-pressure pump 57, the current and past high-fuel pressures Pfhi, Pfhi1, and Pfhi2, the rotation speed variation amount $\Delta$Nlp, the actuation current variation amount $\Delta$Ilp, and the actuation voltage variation amount $\Delta$Vlp of the feed pump 52, and the consumed flow rate variation amount $\Delta$Qfec of the engine 12 are set to input variables x[1] to x[29] of the third low-fuel pressure mapping and the set input variables x[1] to x[29] are applied to the third low-fuel pressure mapping.

In this modified example, the third low-fuel pressure mapping is a neural network similarly to the tank fuel temperature mapping. Thus, the process of Step S750D is a process for deriving the low-fuel pressure Pflo by applying the input variables x[1] to x[29] to the third low-fuel pressure mapping that is the neural network. Also in this case, the low-fuel pressure Pflo can be estimated similarly to the embodiment. The third low-fuel pressure mapping can be generated by a method similar to that for the low-fuel pressure mapping.

In the vehicle 10 of the embodiment and the modified examples, the inputs to the low-fuel pressure mapping, the second low-fuel pressure mapping, and the third low-fuel pressure mapping for use in the low-fuel pressure estimation routines of FIG. 8, FIG. 19, and FIG. 20 include the data acquired in Step S720, specifically, the rotation speed variation amount $\Delta$Nlp, the actuation current variation amount $\Delta$Ilp, and the actuation voltage variation amount $\Delta$Vlp of the feed pump 52 and the consumed flow rate variation amount $\Delta$Qfec of the engine 12. The inputs may include only a part of the data acquired in Step S720. Further, the inputs may include none of the data acquired in Step S720. In this case, the low-fuel pressure Pflo is estimated without consideration of the overshoot amount with respect to the base value of the fuel pressure in the low-pressure supply pipe 53.

In the vehicle 10 of the embodiment and the modified examples, the inputs to the pulsation mapping, the second low-fuel pressure mapping, and the third low-fuel pressure mapping for use in the low-fuel pressure estimation routines of FIG. 8, FIG. 19, and FIG. 20 include the data acquired in Step S710, specifically, the current and past cam angles $\theta ci$, $\theta ci1$, and $\theta ci2$, the current and past rotation speeds Ne, Ne1, and Ne2, and the current and past load factors KL, KL1, and KL2 of the engine 12, the current and past discharge flow rates Qfhpo, Qfhpo1, and Qfhpo2 of the high-pressure pump 57, and the current and past high-fuel pressures Pfhi, Pfhi1, and Pfhi2.

The inputs only need to include the current and past cam angles $\theta ci$, $\theta ci1$, and $\theta ci2$. Therefore, the inputs need not include the current and past rotation speeds Ne, Ne1, and Ne2, the current and past load factors KL, KL1, and KL2, the current and past discharge flow rates Qfhpo, Qfhpo1, and Qfhpo2 of the high-pressure pump 57, or the current and past high-fuel pressures Pfhi, Pfhi1, and Pfhi2.

Regarding each of the cam angle $\theta ci$, the rotation speed Ne, the load factor KL, the discharge flow rate Qfhpo, and the high-fuel pressure Pfhi, the number of pieces of past data is not limited to two, and may be one, three, or more.

The inputs to the low-fuel pressure mapping need not include the pulsation component Pflopl. The inputs to the second low-fuel pressure mapping and the third low-fuel pressure mapping may include none of the data acquired in Step S710. In those cases, the low-fuel pressure Pflo is estimated without consideration of the pulsation of the fuel pressure in the low-pressure supply pipe 53.

In the vehicle 10 of the embodiment and the modified examples, the electronic control unit 70 estimates the pulsation component Pflopl by using the pulsation mapping through the low-fuel pressure estimation routine of FIG. 8. However, the electronic control unit 70 need not estimate the pulsation component Pflopl. At this time, the inputs to the low-fuel pressure mapping for use in the low-fuel pressure estimation routine of FIG. 8 do not include the pulsation component Pflopl.

In the vehicle 10 of the embodiment and the modified examples, the inputs to the base value mapping and the third low-fuel pressure mapping for use in the low-fuel pressure estimation routines of FIG. 8, FIG. 19, and FIG. 20 include the data acquired in Step S700, specifically, the rotation speed Nlp, the actuation current Ilp, the actuation voltage Vlp, and the characteristic variable Alp of the feed pump 52, the consumed flow rate Qfec of the engine 12, the tank fuel temperature Tftnk, the alcohol concentration Cfal of the fuel, the tank internal pressure Ptnk, the pressure loss Llo of the low-pressure supply pipe 53, and the high-pressure pump fuel temperature Tfhp.

The inputs to the base value mapping and the third low-fuel pressure mapping may include, as a value related to the rotation speed Nlp of the feed pump 52, the target discharge flow rate Qflpo*, the target rotation speed Nlp*, or the target duty Dlp* to be used for controlling the feed pump 52. Further, the inputs to the base value mapping and the third low-fuel pressure mapping need not include the actuation voltage Vlp of the feed pump 52 or the characteristic variable Alp of the feed pump 52.

The inputs to the base value mapping and the third low-fuel pressure mapping need not include the tank fuel temperature Tftnk or the alcohol concentration Cfal of the fuel. In place of the tank fuel temperature Tftnk, the inputs may include at least a part of the rotation speed variation amount ΔNlp of the feed pump 52, the intake air temperature variation amount ΔTa, the air-fuel ratio variation amount ΔAF, the coolant temperature variation amount ΔTw, and the rotation speed variation amount ΔNe of the engine 12, the outside air temperature variation amount ΔTout, the average fuel amount Qftnkav in the fuel tank 51, the average rotation speed Nrfav of the radiator fan 62, and the average vehicle speed Vav for use in the estimation of the tank fuel temperature Tftnk. In place of the alcohol concentration Cfal, the inputs may include at least a part of the average intake air temperature Taav, the average air-fuel ratio AFav, the average coolant temperature Twav, the average oil temperature Toilav, the average rotation speed Neav, the average load factor KLav, the average torque Teav, and the average ignition timing Tiav of the engine 12 for use in the estimation of the alcohol concentration Cfal.

The inputs to the base value mapping and the third low-fuel pressure mapping need not include the tank internal pressure Ptnk. In place of the tank internal pressure Ptnk, the inputs may include the fuel amount Qftnk in the fuel tank 51 for use in the estimation of the tank internal pressure Ptnk. The inputs to the base value mapping and the third low-fuel pressure mapping need not include the characteristic variable Alp. The inputs to the base value mapping and the third low-fuel pressure mapping may include at least a part of the rotation speed Nlp, the actuation current Ilp, and the actuation voltage Vlp of the feed pump 52 and the tank fuel temperature Tftnk when the termination condition for the relief pressure control is satisfied for use in the setting of the characteristic variable Alp. The inputs to the base value mapping and the third low-fuel pressure mapping need not include the pressure loss Llo of the low-pressure supply pipe 53. The inputs to the base value mapping and the third low-fuel pressure mapping need not include the high-pressure pump fuel temperature Tfhp. In place of the high-pressure pump fuel temperature Tfhp, the inputs may include at least a part of the intake air temperature Ta, the oil temperature Toil, the rotation speed Ne, and the load factor KL of the engine 12, the intake flow rate Qfhpi of the high-pressure pump 57, and the vehicle speed V for use in the estimation of the high-pressure pump fuel temperature Tfhp.

Figure 21:
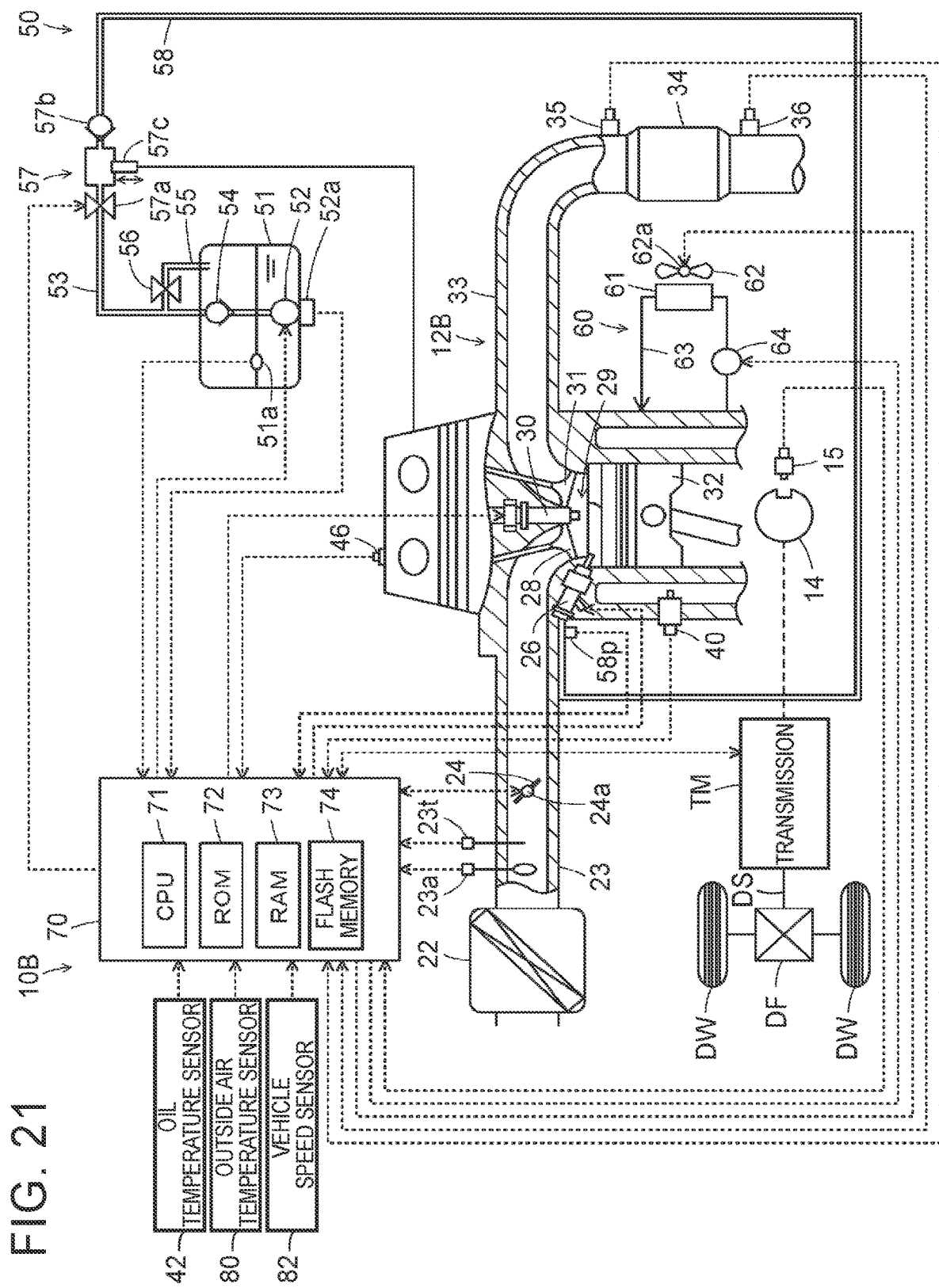
FIG. 21 is a structural diagram illustrating an overview of the structure of a vehicle 10B.

In the vehicle 10 of the embodiment and the modified examples described above, the engine 12 includes the port injection valve 25 and the direct injection valve 26 as illustrated in FIG. 1. There may be employed such a case that an engine 12B does not have the port injection valve 25 as in a vehicle 10B of FIG. 21. In the hardware structure of the vehicle 10B, the electronic control unit 70 may execute, for example, the tank fuel temperature estimation routine of FIG. 2, the alcohol concentration estimation routine of FIG. 3, the tank internal pressure estimation routine of FIG. 4, the characteristic variable setting routine of FIG. 5, the pressure loss estimation routine of FIG. 6, the high-pressure pump fuel temperature estimation routine of FIG. 7, and the low-fuel pressure estimation routine of FIG. 8 similarly to the embodiment and the modified examples. Thus, the electronic control unit 70 can estimate the tank fuel temperature Tftnk, the alcohol concentration Cfal, the tank internal pressure Ptnk, the characteristic variable Alp of the feed pump 52, the pressure loss Llo of the low-pressure supply pipe 53, the high-pressure pump fuel temperature Tfhp, the base value Pflobs, the pulsation component Pflopl, and the low-fuel pressure Pflo.

Figure 22:
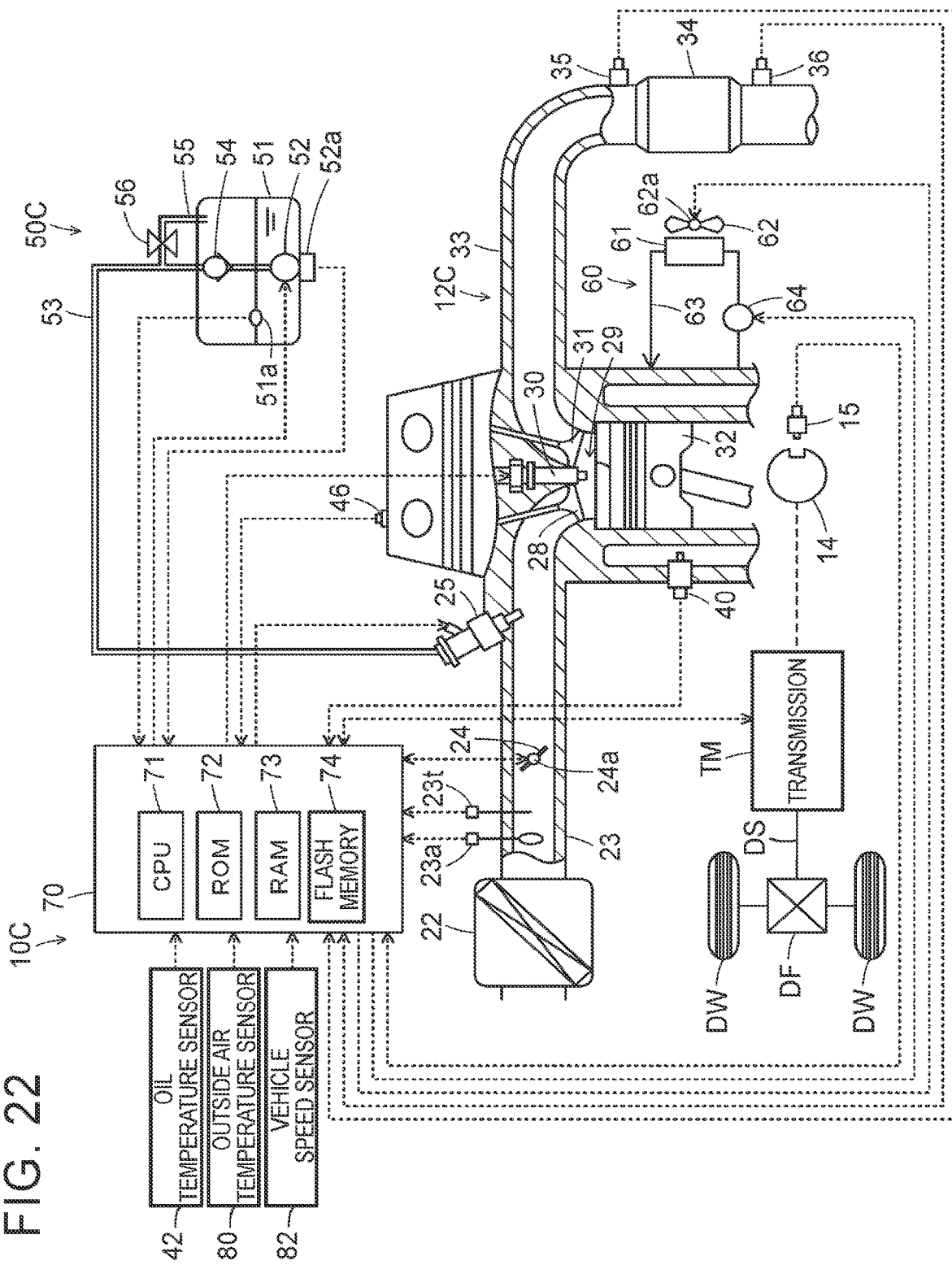
FIG. 22 is a structural diagram illustrating an overview of the structure of a vehicle 10C.

In the vehicle 10 of the embodiment and the modified examples described above, the engine 12 includes the port injection valve 25 and the direct injection valve 26 as illustrated in FIG. 1. There may be employed such a case that an engine 12C does not have the direct injection valve 26 and a fuel supply apparatus 50C does not have the high-pressure pump 57, the high-pressure supply pipe 58, and the fuel pressure sensor 58p as in a vehicle 10C of FIG. 22. In the hardware structure of the vehicle 10C, the electronic control unit 70 may execute, similarly to the embodiment and the modified examples, the tank fuel temperature estimation routine of FIG. 2, the alcohol concentration estimation routine of FIG. 3, the tank internal pressure estimation routine of FIG. 4, the characteristic variable setting routine of FIG. 5 (except the prohibition or permission of the execution of the high-pressure pump fuel temperature estimation routine of FIG. 7), the pressure loss estimation routine of FIG. 6, and other routines that are not related to the high-pressure pump 57 and the high-pressure supply pipe 58. Thus, the electronic control unit 70 can estimate the tank fuel temperature Tftnk, the alcohol concentration Cfal, the tank internal pressure Ptnk, the characteristic variable Alp of the feed pump 52, and the pressure loss Llo of the low-pressure supply pipe 53. Since the vehicle 10C does not have the high-pressure pump 57 and the high-pressure supply pipe 58, there is no need to execute the high-pressure pump fuel temperature estimation routine of FIG. 7. The vehicle 10C does not have the high-pressure pump 57 and the high-pressure supply pipe 58, and the fuel pressure in the low-pressure supply pipe 53 does not pulsate due to the driving of the high-pressure pump 57. In the low-fuel pressure estimation routine of FIG. 8 or other figures, the electronic control unit 70 may estimate the low-fuel pressure Pflo without consideration of the high-pressure pump fuel temperature and the pulsation of the fuel pressure in the low-pressure supply pipe 53.

In the vehicles 10, 10B, and 10C of the embodiment and the modified examples described above, the electronic control unit 70 estimates the tank fuel temperature Tftnk by using the tank fuel temperature mapping. However, the vehicles 10, 10B, and 10C may include the fuel temperature sensor 51t (see FIG. 10).

In the vehicles 10, 10B, and 10C of the embodiment and the modified examples described above, the electronic control unit 70 estimates the tank internal pressure Ptnk by using the tank internal pressure mapping. However, the vehicles 10, 10B, and 10C may include the internal pressure sensor 51p (see FIG. 10).

In the vehicles 10 and 10B of the embodiment and the modified examples described above, the electronic control unit 70 estimates the high-pressure pump fuel temperature Tfhp by using the high-pressure pump fuel temperature mapping. However, the vehicles 10 and 10B may include the fuel temperature sensor 58t (see FIG. 10).

Figure 23:
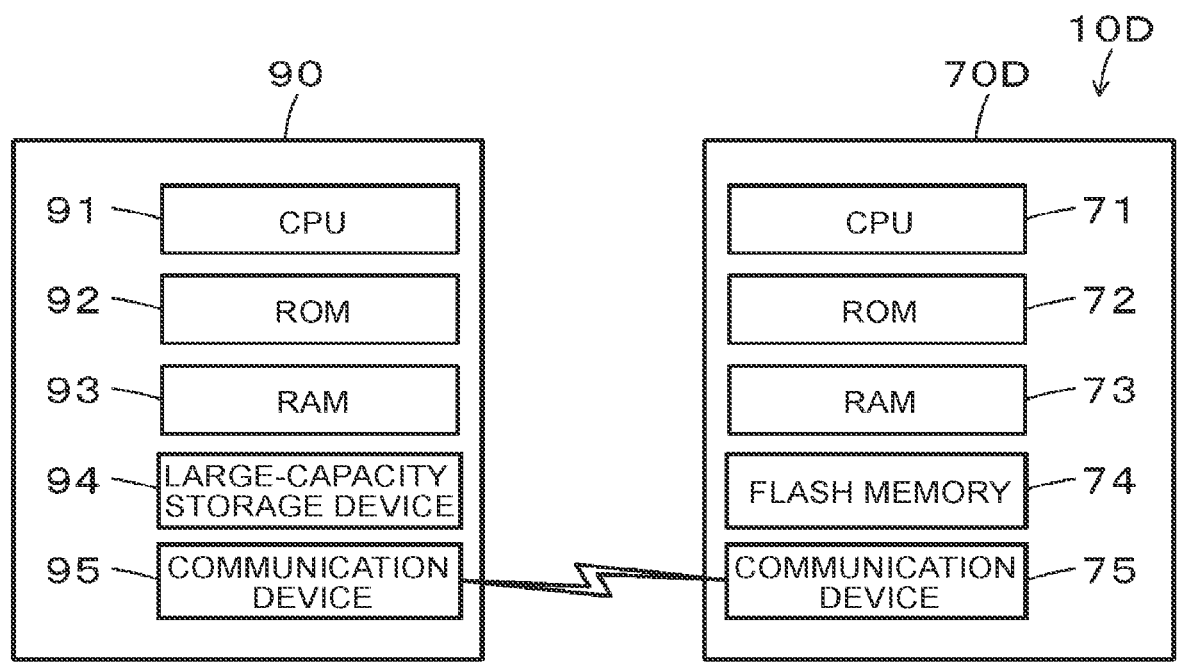
FIG. 23 is a structural diagram illustrating an overview of the structures of an electronic control unit 70D mounted on a vehicle 10D and a server 90 located outside the vehicle.

In the vehicle 10 of the embodiment described above, the electronic control unit 70 estimates, for example, the tank fuel temperature Tftnk, the alcohol concentration Cfal, the tank internal pressure Ptnk, the characteristic variable Alp, and the pressure loss Llo of the low-pressure supply pipe 53 by using the tank fuel temperature mapping, the alcohol concentration mapping, the tank internal pressure mapping, the characteristic variable mapping, and the pressure loss mapping. The electronic control unit 70 also estimates the base value Pflobs, the pulsation component Pflopl, and the low-fuel pressure Pflo by using the base value mapping, the pulsation mapping, and the low-fuel pressure mapping. The same applies to the vehicles 10B and 10C. Those values may be estimated outside the vehicle. FIG. 23 is a structural diagram illustrating an overview of the structures of an electronic control unit 70D mounted on a vehicle 10D and a server 90 located outside the vehicle. The vehicle 10D is structured similarly to the vehicle 10, 10B, or 10C. In this modified example, the electronic control unit 70D and the server 90 may be regarded as "fuel type estimation system", the electronic control unit 70D may be regarded as "control apparatus for fuel supply apparatus", and the server 90 may be regarded as "data analysis apparatus".

The electronic control unit 70D of the vehicle 10D includes a communication device 75 in addition to a CPU 71, a ROM 72, a RANI 73, and a flash memory 74 similar to those of the electronic control unit 70 of the vehicle 10 of the embodiment or the like. The flash memory 74 of the vehicle 10D does not store the mappings (for example, the low-fuel pressure mapping) that are stored in the flash memory 74 of each of the vehicles 10, 10B, and 10C. The flash memory 74 may be omitted. The communication device 75 communicates with the server 90 via a network.

The server 90 analyzes data from vehicles including the vehicle 10D. The server 90 includes a CPU 91, a ROM 92, a RAM 93, a large-capacity storage device (for example, an HDD or an SSD) 94, and a communication device 95. The large-capacity storage device 94 stores the mappings (for example, the low-fuel pressure mapping) that are stored in the flash memory 74 of each of the vehicles 10, 10B, and 10C. The communication device 95 communicates with the vehicles including the vehicle 10D via the network.

Figure 24:
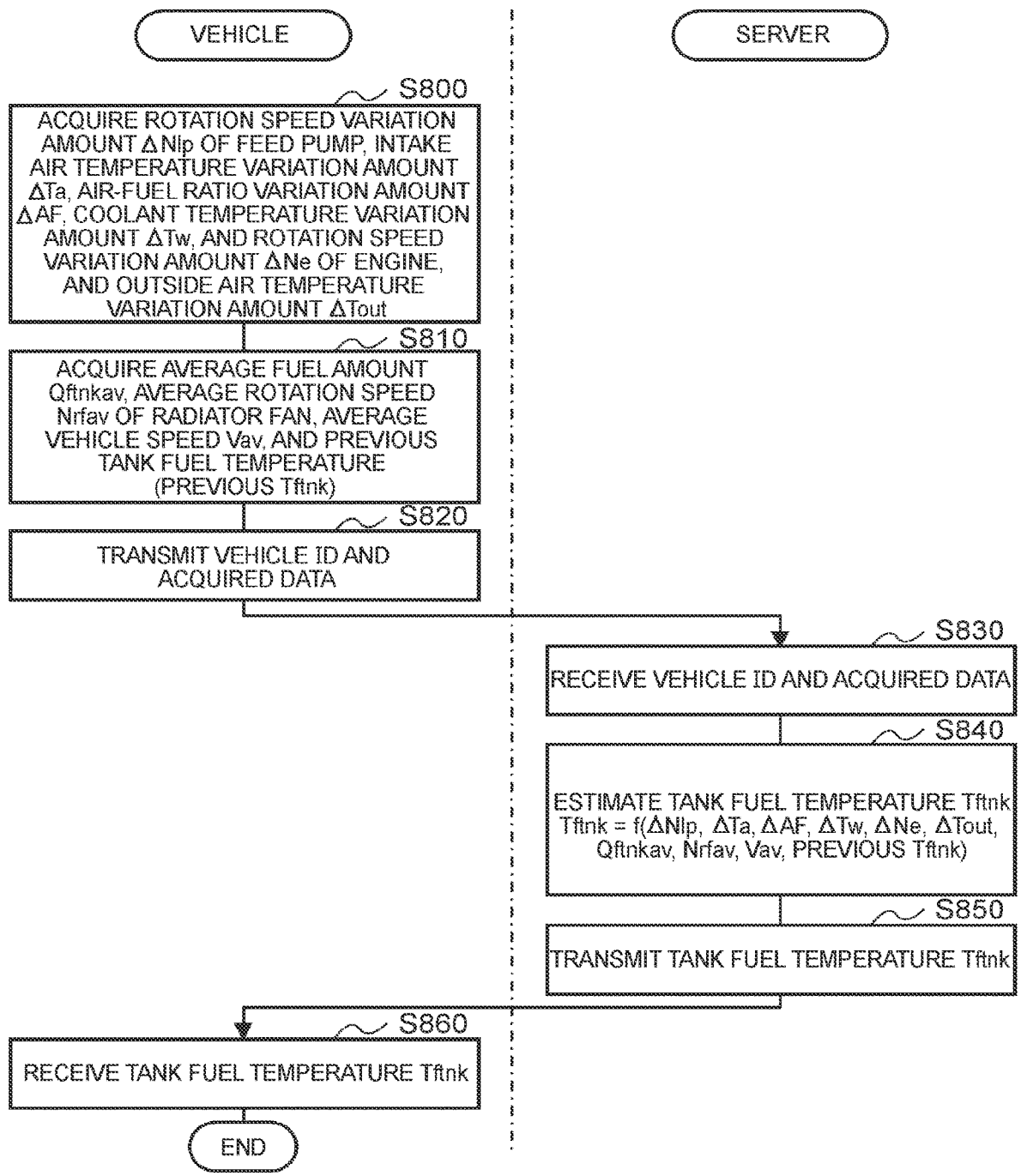
FIG. 24 is a flowchart illustrating an example of a flow of processes to be performed by the electronic control unit 70D and the server 90 when estimating a tank fuel temperature Tftnk.

FIG. 24 is a flowchart illustrating an example of a flow of processes to be performed by the electronic control unit 70D and the server 90 when estimating the tank fuel temperature Tftnk. As illustrated in FIG. 24, the electronic control unit 70D of the vehicle 10D first acquires data similar to that in the processes of Steps S100 and S110 of the tank fuel temperature estimation routine of FIG. 2 (Steps S800 and S810), and transmits the acquired data to the server 90 together with a vehicle identifier (ID) that is an identification number of the vehicle 10D (Step S820).

When the data is received from the vehicle 10D (Step S830), the server 90 estimates a tank fuel temperature Tftnk by using the received data and the tank fuel temperature mapping similarly to the process of Step S120 of the tank fuel temperature estimation routine of FIG. 2 (Step S840), and transmits the estimated tank fuel temperature Tftnk to the vehicle 10D (Step S850). The vehicle 10D receives the tank fuel temperature Tftnk (Step S860), and terminates the sequence flow. Through the series of processes described above, a processing load on the CPU 71 of the vehicle 10D can be reduced.

In FIG. 24, description is given of the flow of the processes performed by the electronic control unit 70D and the server 90 when estimating the tank fuel temperature Tftnk. Similar flows are conceivable as flows of processes to be performed by the electronic control unit 70D and the server 90 when estimating the alcohol concentration Cfal, the tank internal pressure Ptnk, the characteristic variable Alp, the pressure loss Llo, the base value Pflobs, the pulsation component Pflopl, the low-fuel pressure Pflo, and the like. That is, the electronic control unit 70D acquires various types of data, and transmits the data to the server 90. The server 90 receives the various types of data from the electronic control unit 70D, estimates the alcohol concentration Cfal, the tank internal pressure Ptnk, the characteristic variable Alp, the pressure loss Llo, the base value Pflobs, the pulsation component Pflopl, the low-fuel pressure Pflo, and the like, and transmits the estimated values to the electronic control unit 70D. The electronic control unit 70D receives the alcohol concentration Cfal, the tank internal pressure Ptnk, the characteristic variable Alp, the pressure loss Llo, the base value Pflobs, the pulsation component Pflopl, the low-fuel pressure Pflo, and the like.

As illustrated in FIG. 23, description is given of the aspect relating to the fuel type estimation system including the electronic control unit 70D mounted on the vehicle 10D and the server 90 located outside the vehicle. There may be adopted an aspect relating to the server 90 serving as the data analysis apparatus for use in the fuel type estimation system, or an aspect relating to the electronic control unit 70D serving as the control apparatus for the fuel supply apparatus 50 for use in the fuel type estimation system.

In the embodiment and the modified examples described above, the tank fuel temperature mapping, the alcohol concentration mapping, the tank internal pressure mapping, the high-pressure pump fuel temperature mapping, the base value mapping, the pulsation mapping, and the low-fuel pressure mapping are generated by using neural networks as a method of machine learning. Those mappings may be generated by a method other than neural networks, such as a random forest, a support vector machine, or long short-term memory (LSTM). Those mappings may also be generated as, for example, maps or arithmetic expressions through manual experiment or analysis.

In the embodiment and the modified examples described above, the characteristic variable mapping and the pressure loss mapping are set as, for example, maps or arithmetic expressions through manual experiment or analysis. The characteristic variable mapping and the pressure loss mapping may be set by machine learning.

In the embodiment and the modified examples described above, the tank fuel temperature Tftnk and the high-pressure pump fuel temperature Tfhp are estimated as the temperatures of the fuel. A temperature of the fuel in the low-pressure supply pipe 53 may be estimated in place of the tank fuel temperature Tftnk.

In the embodiment and the modified examples described above, the alcohol concentration Cfal is estimated as the fuel type. For example, a viscosity $\eta f$ may be estimated in addition to or in place of the alcohol concentration Cfal.

Description is given of correspondences between the principal elements of the embodiment and the principal elements of the disclosure described in "SUMMARY". The engine 12 of the embodiment may be regarded as "engine". The fuel supply apparatus 50 may be regarded as "fuel supply apparatus". The electronic control unit 70 may be regarded as "fuel type estimation system". The flash memory 74 may be regarded as "storage device". The CPU 71 may be regarded as "execution device".

The correspondences between the principal elements of the embodiment and the principal elements of the disclosure described in "SUMMARY" are examples for detailing the embodiment of the disclosure described in "SUMMARY", and are not therefore intended to limit the elements of the disclosure described in "SUMMARY". That is, the disclosure described in "SUMMARY" should be interpreted based on the description of this section, and the embodiment is a specific example of the disclosure described in "SUMMARY".

Although the embodiment of the present disclosure is described above, the applicable embodiment is not limited to the embodiment, and various other embodiments may be adopted without departing from the spirit of the present disclosure.

The present disclosure is applicable to, for example, industry of manufacturing a fuel type estimation system.

What is claimed is:

1. A fuel type estimation system configured to estimate a type variable related to a type of fuel in an engine system, the engine system including an engine including a fuel injection valve, and a fuel supply apparatus including a fuel pump configured to supply the fuel in a fuel tank to a supply pipe connected to the fuel injection valve, the fuel type estimation system comprising:
    a storage device configured to store a mapping that uses, as inputs, input variables including an engine variable related to a condition of the engine and outputs the type variable; and
    an execution device configured to acquire the input variables, estimate the type variable by applying the acquired input variables to the mapping, and adjust the fuel supply apparatus based on the type variable.

2. The fuel type estimation system according to claim 1, wherein the engine variable includes at least a part of:
    an intake air temperature variable related to an intake air temperature of the engine;
    an air-fuel ratio variable related to an air-fuel ratio of the engine;
    a coolant temperature variable related to a temperature of a coolant of the engine;
    an oil temperature variable related to a temperature of lubricating oil of the engine;
    an engine speed variable related to a rotation speed of the engine;
    a load factor variable related to a load factor of the engine;
    an engine torque variable related to a torque of the engine; and
    an ignition timing variable related to an ignition timing of the engine.

3. The fuel type estimation system according to claim 2, wherein the execution device is configured not to estimate the type variable in at least one of a case where the engine speed variable is a value corresponding to zero for the rotation speed of the engine and a case where the engine torque variable is a value corresponding to zero for the torque of the engine.

4. The fuel type estimation system according to claim 1, wherein:
    the fuel supply apparatus further includes a relief valve provided in the supply pipe;
    the execution device is configured to execute, when the fuel is supplied to the fuel tank, relief pressure control for driving the fuel pump to open the relief valve until a predetermined termination condition is satisfied; and
    the execution device is configured not to estimate, when the fuel is supplied to the fuel tank, the type variable until the predetermined termination condition is satisfied.

5. The fuel type estimation system according to claim 4, wherein the predetermined termination condition is that a cumulative value of consumed flow rate variables after the fuel is supplied to the fuel tank is equal to or larger than a predetermined value.

6. The fuel type estimation system according to claim 4, wherein:
    the execution device is configured to drive the fuel pump to rotate at a predetermined rotation speed as the relief pressure control; and
    the predetermined termination condition is that a change amount of an actuation current of the fuel pump in a predetermined period is equal to or smaller than a predetermined change amount.

7. The fuel type estimation system according to claim 1, wherein:
    the execution device includes
        a first execution device mounted on a vehicle, and
        a second execution device located outside the vehicle;
    the first execution device is configured to
        acquire the input variables,
        transmit the acquired input variables to the second execution device, and
        receive estimated data from the second execution device; and
    the second execution device is configured to
        receive the input variables from the first execution device,
        estimate the type variable by applying the received input variables to the mapping,
        adjust a fuel supply apparatus based on the estimated type variable, and
        transmit the estimated type variable to the first execution device as the estimated data.

8. A data analysis apparatus for use in a fuel type estimation system configured to estimate a type variable related to a type of fuel in an engine system,
    the engine system including:
        an engine including a fuel injection valve; and
        a fuel supply apparatus including a fuel pump configured to supply the fuel in a fuel tank to a supply pipe connected to the fuel injection valve,
    the fuel type estimation system including:
        a storage device configured to store a mapping that uses; as inputs, input variables including an engine variable related to a condition of the engine and outputs the type variable; and
        an execution device configured to acquire the input variables, estimate the type variable by applying the acquired input variables to the mapping, and adjust the fuel supply apparatus based on the estimated van able type,
    the execution device including a first execution device and a second execution device, the first execution device being configured to acquire the input variables, transmit the acquired input variables to the second execution device, and receive estimated data from the second execution device, the second execution device being configured to receive the input variables from the first execution device, estimate the type variable by applying the received input variables to the mapping, and transmit the estimated type variable to the first execution device as the estimated data,
    the data analysis apparatus comprising the second execution device and the storage device.

9. A control apparatus for a fuel supply apparatus for use in a fuel type estimation system configured to estimate a type variable related to a type of fuel in an engine system,
    the engine system including:
        an engine including a fuel injection valve; and
        the fuel supply apparatus including a fuel pump configured to supply the fuel in a fuel tank to a supply pipe connected to the fuel injection valve,
    the fuel type estimation system including:

a storage device configured to store a mapping that uses; as inputs, input variables including an engine variable related to a condition of the engine and outputs the type variable; and an execution device configured to acquire the input variables, estimate the type variable by applying the acquired input variables to the mapping, and adjust the fuel supply apparatus based on the estimated van able type, the execution device including a first execution device and a second execution device, the first execution device being configured to acquire the input variables, transmit the acquired input variables to the second execution device, and receive estimated data from the second execution device, the second execution device being configured to receive the input variables from the first execution device, estimate the type variable by applying the received input variables to the mapping, and transmit the estimated type variable to the first execution device as the estimated data, the control apparatus for the fuel supply apparatus comprising the first execution device.

* * * * *